(12) United States Patent
Ji et al.

(10) Patent No.: US 8,964,689 B2
(45) Date of Patent: Feb. 24, 2015

(54) METHOD AND APPARATUS FOR OPERATING MULTI-BAND AND MULTI-CELL

(71) Applicant: Samsung Electronics Co., Ltd., Gyeonggi-do (KR)

(72) Inventors: Hyoung-Ju Ji, Seoul (KR); Joon-Young Cho, Gyeonggi-do (KR); Young-Bum Kim, Seoul (KR); Hee-Don Gha, Gyeonggi-do (KR); Ju-Ho Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 196 days.

(21) Appl. No.: 13/647,720

(22) Filed: Oct. 9, 2012

(65) Prior Publication Data

US 2013/0089067 A1    Apr. 11, 2013

(30) Foreign Application Priority Data

Oct. 6, 2011   (KR) ........................ 10-2011-0101949

(51) Int. Cl.
*H04W 4/00*    (2009.01)
*H04W 56/00*   (2009.01)
*H04W 72/04*   (2009.01)

(52) U.S. Cl.
CPC ............ *H04W 56/00* (2013.01); *H04W 72/042* (2013.01); *H04W 72/0453* (2013.01)
USPC ....................................................... 370/330

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | | |
|---|---|---|---|
| 2010/0298031 A1* | 11/2010 | Han et al. | 455/561 |
| 2010/0315954 A1* | 12/2010 | Singh et al. | 370/241 |
| 2011/0086074 A1* | 4/2011 | Karatgi et al. | 424/400 |
| 2011/0190011 A1* | 8/2011 | Choi et al. | 455/466 |
| 2011/0194501 A1* | 8/2011 | Chung et al. | 370/328 |
| 2011/0312328 A1* | 12/2011 | Choi et al. | 455/450 |
| 2012/0275399 A1* | 11/2012 | Liu et al. | 370/329 |
| 2012/0315841 A1* | 12/2012 | Zhou et al. | 455/11.1 |
| 2013/0028118 A1* | 1/2013 | Cherian et al. | 370/252 |
| 2013/0039227 A1* | 2/2013 | Ji et al. | 370/277 |
| 2013/0155983 A1* | 6/2013 | Choi et al. | 370/329 |

FOREIGN PATENT DOCUMENTS

| | | |
|---|---|---|
| KR | 1020110036574 | 4/2011 |
| WO | WO 2010/075656 | 7/2010 |

* cited by examiner

*Primary Examiner* — Jung-Jen Liu
(74) *Attorney, Agent, or Firm* — The Farrell Law Firm, P.C.

(57) ABSTRACT

Disclosed are a method and an apparatus for operating multi-band and multi-cell. An Enhanced Node B (eNB) transmits a synchronization channel and a broadcasting channel for narrow-band user equipments (UEs) through a first band narrower than a system band, the first band being located in a center band of the system band, and transmits a control channel for scheduling a data channel for a first narrow-band UE which is one of the narrow-band UEs through a second band equal to or wider than the first band, the second band not overlapping the first band within the system band. The first band is designed to be matched to a band where the synchronization channel and the broadcasting channel of a host cell using an entire system band are transmitted.

26 Claims, 17 Drawing Sheets

METHOD AND APPARATUS FOR OPERATING MULTI-BAND AND MULTI-CELL

PRIORITY

This application claims the priority under 35 U.S.C. §119 (a) to Korean Application Serial No. 10-2011-0101949, which was filed in the Korean Intellectual Property Office on Oct. 6, 2011, the content of which are incorporated herein by reference.

BACKGROUND OF THE INVENTION

1. Field of the Invention

The present invention relates generally to transmission/reception of a signal in a communication system, and more particularly, to a method and an apparatus for supporting multi-band communication in a system band.

2. Description of the Related Art

A mobile communication system has been developed to enhance user activities and provide a voice service. This system has been gradually extended to support both data and voice services, and now provides a high-speed data service. Due to insufficient resources and user demands for a high-speed service, a more improved mobile communication technology is required in the current mobile communication system.

In order to meet such a demand, a standard for Long Term Evolution-Advanced (LTE-A) evolved from the 3rd Generation Partnership Project (3GPP) is being developed. The LTE-A will implement high-speed packet based communication having a maximum transmission rate of 1 Gbps. To this end, various plans have been discussed, such as for multiplexing a structure of a network and concurrently providing services in a particular area by a plurality of enhanced Node Bs (eNBs), and increasing the number of frequency bands supported by one eNB.

The technique for increasing the number of frequency bands includes a scheme for increasing bandwidths by allocating a plurality of different bands to one cell, and a scheme for supporting a plurality of small bands within one large band. The former is for communication devices supporting a relatively wide bandwidth and high data transmission rate, and the latter is for communication devices requiring a relatively narrow bandwidth and low data transmission rate.

An Orthogonal Frequency Division Multiplexing (OFDM) transmission mode transmits data by using the multi-carrier, and is a type of multi-carrier modulation mode for parallelizing symbol sequences input in series, modulating the symbol sequences to a plurality of subcarriers, that is, a plurality of subcarrier channels having an orthogonal relation, and then transmitting the plurality of subcarrier channels.

An LTE-A system has been designed to support different bands. Each band is considered as an independent cell, and one User Equipment (UE) is connected to a plurality of cells to perform communication. Meanwhile, an increase in costs occurs to process high-speed data. However, a voice-only device requiring a low-speed transmission rate or a device performing communication between machines such as a vending machine does not require a function supporting a multi-band or a technology using high power. A mobile communication system should be configured for continuous communication having a low transmission rate rather than a technology having a wider bandwidth and high efficiency, and should be highly efficient as to energy consumption and have a low-cost of implementation.

Furthermore, demands for a green technology with low power consumption and high efficiency are currently increased, and accordingly, a technology allowing various types of devices described above to coexist within a system is required.

SUMMARY OF THE INVENTION

The present invention provides a method and an apparatus for supporting communication of UEs having different bandwidths in a mobile communication system.

The present invention provides a method and an apparatus for servicing narrow-band UEs supporting a relatively narrower bandwidth than a system bandwidth of an eNB.

The present invention provides a method and an apparatus for operating small bands for narrow-band UEs within one system band.

The present invention provides a method and an apparatus for providing a frequency band and a frame structure in which the eNB simultaneously supports UEs having different bandwidths.

The present invention provides an initial access method of the narrow-band UE through a relatively wide system band, and an apparatus for the same.

The present invention provides a method of transmitting/receiving a channel and overlapping bandwidths for operating the eNB with low power, and an apparatus for the same.

In accordance with a aspect of the present invention, a method of operating multi-band and multi-cell includes transmitting a synchronization channel and a broadcasting channel for narrow-band UEs through a first band narrower than a system band, the first band being located in a center band of the system band, and transmitting a control channel for scheduling a data channel for a first narrow-band UE which is one of the narrow-band UEs through a second band equal to or wider than the first band, the second band not overlapping the first band within the system band, wherein the first band is equal to a band where the synchronization channel and the broadcasting channel of a host cell using an entire system band are transmitted.

In accordance with another aspect of the present invention, a method of performing communication with an eNB operating multi-band and multi-cell includes receiving a synchronization channel and a broadcasting channel for narrow-band UEs through a first band narrower than a system band from an eNB, the first band being located in a center band of the system band, and receiving a control channel for scheduling a data channel for a first narrow-band UE which is one of the narrow-band UEs through a second band equal to or wider than the first band from the eNB, the second band not overlapping the first band within the system band, wherein the first band is equal to a band where the synchronization channel and the broadcasting channel of a host cell using all of an entire system band are transmitted.

In accordance with another aspect of the present invention, an eNB apparatus for operating multi-band and multi-cell includes a first generator for generating a synchronization channel and a broadcasting channel for narrow-band UEs, a second generator for generating a control channel for scheduling a data channel for a first narrow-band UE which is one of the narrow-band UEs, a frequency multiplexer for performing multiplexing by mapping the synchronization channel and the broadcasting channel into a first band narrower than a system band, the first band being located in a center band of the system band and mapping the control channel into a second band equal to or wider than the first band, the second band not overlapping the first band within the system band;

and a controller for controlling operations of the first and second generators and the frequency multiplexer, wherein the first band is equal to a band where the synchronization channel and the broadcasting channel of a host cell using all of an entire system band are transmitted.

In accordance with another aspect of the present invention, a UE apparatus for performing communication with an eNB operating multi-band and multi-cell includes a controller for detecting a synchronization channel and a broadcasting channel for narrow-band UEs through a first band narrower than a system band from the eNB, the first band being located in a center band of the system band, and a control channel detector for detecting a control channel for scheduling a data channel for a first narrow-band UE which is one of the narrow-band UEs through a second band equal to or wider than the first band from the eNB, the second band not overlapping the first band within the system band, wherein the first band is equal to a band where the synchronization channel and the broadcasting channel of a host cell using all of an entire system band are transmitted.

BRIEF DESCRIPTION OF THE DRAWINGS

The above and other aspects, features, and advantages of the present invention will be more apparent from the following detailed description taken in conjunction with the accompanying drawings, in which.

Figure 1A:
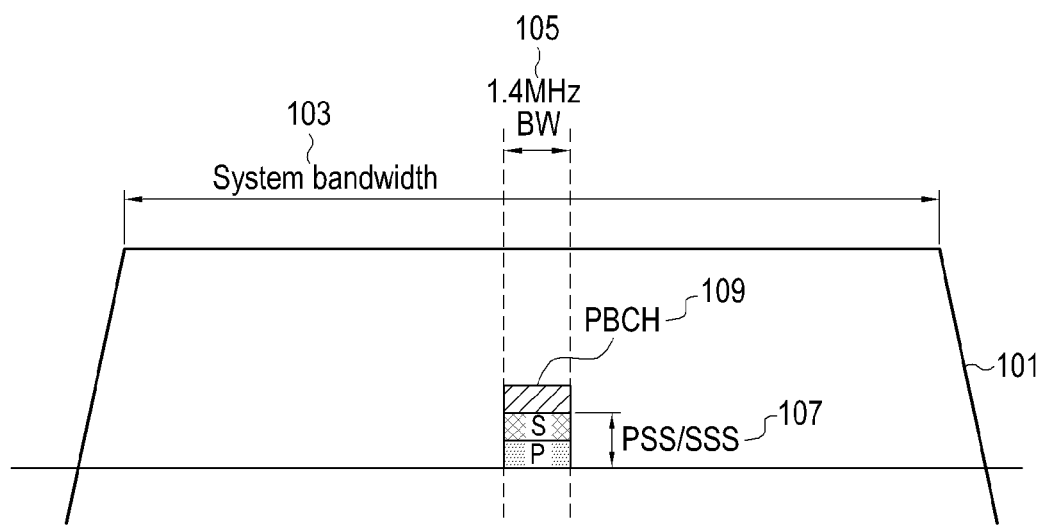
FIGS. 1A and 1B illustrate a frequency band within a system bandwidth and a frame structure in a mobile communication system.

DETAILED DESCRIPTION OF EMBODIMENTS
OF THE PRESENT INVENTION

Hereinafter, embodiments of the present invention will be described with reference to the accompanying drawings. In the following description, the same elements will be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein will be omitted for the sake of clarity and conciseness.

Although the specification describes a system based on compatibility in an LTE-system, an LTE-A system, and their next/previous systems as an example, the present invention is applicable to all types of mobile communication systems using a multi-carrier.

A system applying such a multi-carrier modulation mode was first adopted by a military high frequency radio in the late 1950's, and development began for the OFDM mode overlapping a plurality of subcarriers which are orthogonal to each other in the 1970's, but there was a limitation in an actual system application because an implementation of orthogonal modulation between multi-carriers was difficult. However, as Weinstein reported that modulation and demodulation using the OFDM mode can be efficiently processed through a Discrete Fourier Transform (DFT), a technology for the OFDM mode was rapidly developed. Further, as a guard interval is used and a method of inserting a Cyclic Prefix (CP) symbol in the guard interval is known, negative effects on a multi-path and a delay spread are further reduced.

On the strength of such a technical development, the OFDM mode technology is widely applied to digital transmission technologies such as Digital Audio Broadcasting (DAB), Digital Video Broadcasting (DVB), a Wireless Local Area Network (WLAN), and a Wireless Asynchronous Transfer Mode (WATM). That is, the OFDM mode was not widely used due to its hardware complexity, but now can be implemented as various digital signal processing technologies including a Fast Fourier Transform (FFT) and an Inverse Fast Fourier Transform (IFFT).

The OFDM mode is similar to a conventional Frequency Division Multiplexing (FDM) mode, but has characteristics capable of obtaining an optimal transmission efficiency in high-speed data transmission by performing transmission while maintaining orthogonality between a plurality of tones. Further, the OFDM mode has a high frequency use efficiency and is strong on a multi-path fading, thereby obtaining an optimal transmission efficiency in high-speed data transmission.

In addition to the above mentioned characteristics, the OFDM mode has advantages as well in that the OFDM mode may efficiently use a frequency because frequency spectrums are used in an overlapping manner, is strong on a frequency selective fading and the multi-path fading, may reduce an Inter Symbol Interference (ISI) effect by using the guard interval, may enable a simple design of an equalizer structure in hardware, and is strong on impulse noise. Due to the advantages, the OFDM mode is actively used for a communication system structure.

Factors interrupting a high-speed and high-quality data service in the wireless communication substantially come from a channel environment that is frequently changed by a change in reception signal power generated due to a fading phenomenon, shadowing, a Doppler effect according to a movement or a frequent speed change of the UE, and interference by a multi-path signal as well as Additive White Gaussian Noise (AWGN). Accordingly, in order to support the high-speed and high-quality data service in the wireless communication, it is required to effectively remove these obstacles of the channel environment.

A modulation signal is located on two-dimensional resources including a time and a frequency in the OFDM mode. The resources on a time domain are distinguished by different OFDM symbols, which are orthogonal to each other. The resources on a frequency domain are distinguished by different tones, which are orthogonal to each other. That is, one minimum unit resource may be defined by designating a particular OFDM symbol on the time domain and a particular tone on the frequency domain in the OFDM mode, and is referred to as a Resource Element (RE). Different REs from each other have orthogonal characteristics even though the REs have experienced a frequency selective channel, so that signals transmitted to the different REs may be received by a reception side without interference.

A physical channel is a channel of a physical layer transmitting the modulation symbol modulated from one or more encoded bitstreams. In an Orthogonal Frequency Division Multiple Access (OFDMA) system, a plurality of physical channels are configured and transmitted according to a purpose of a transmitted information stream or a receiver. The transmitter and the receiver have to prearrange the RE on which one physical channel is disposed and transmitted, based on a mapping rule.

Figure 1B:
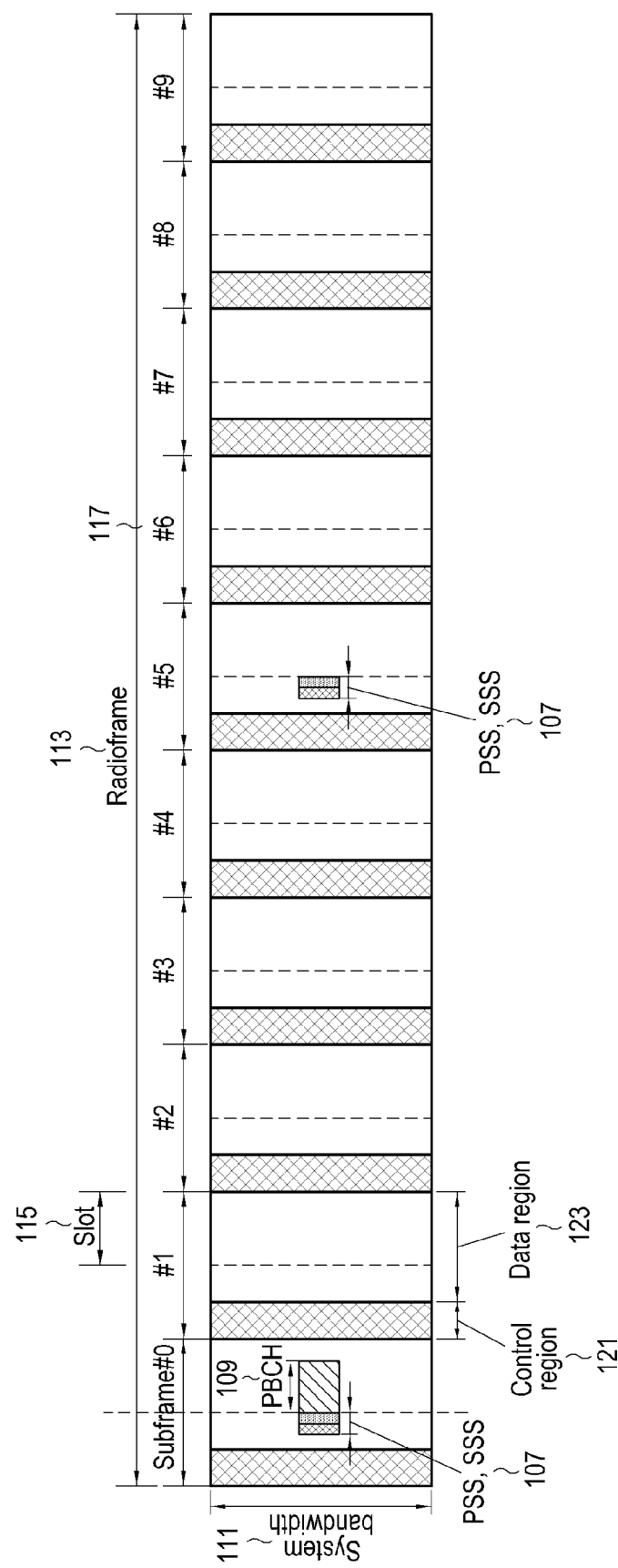

FIGS. 1A and 1B illustrate a downlink band and a frame structure in a mobile communication system.

Referring to FIG. 1A, a downlink bandwidth 101 consists of a plurality of Physical Resource Blocks (PRBs), and each PRB may consist of twelve frequency tones (or subcarriers) arranged on the frequency domain and fourteen or twelve OFDM symbols arranged on the time domain. The PRB is a basic unit of resource allocation. A Reference Signal (RS) is a signal prearranged between a UE and an eNB which transmits the signal to the UE so that the UE can estimate a channel, and includes a Common Reference Signal (CRS) and a Dedicated Reference Signal (DRS) in the LTE system.

The downlink bandwidth 101 in the LTE system occupies an entire system bandwidth 103 defined on the frequency, and ranges from a minimum of 1.4 MHz to a maximum of 20 MHz. In the LTE system supporting various frequency bandwidths, since the system bandwidth 103 cannot be known in advance before the UE initially accesses the LTE system, each eNB transmits a signal for an initial access through a band of 1.4 MHz corresponding to a minimum bandwidth supported by the LTE system.

A center band 105 is 104 MHz located in a center of the system bandwidth 103, and transmits a signal and a channel required for the initial access. Accordingly, the UE filters only the center band 105 and scans a cell during an initial cell search period. When the scanning is completed, the UE receives system information to recognize information on the system bandwidth 103, and controls a frequency range of a reception filter to fit to the system bandwidth 103, so that the UE may receive an entire band in the future. The signal and the channel transmitted in the center band 105 for the initial access are a Primary Synchronization Signal (PSS) and a Secondary Synchronization Signal (SSS) 107, and a Physical Broadcast Channel (PBCH) 109. The PSS and the SSS (PSS/SSS) are synchronization channel signals used for acquiring system synchronization and recognizing a cell identity, and the PBCH is a broadcast channel used for transmitting a Master Information Block (MIB) among system information of the eNB. The PBCH contains information on the system bandwidth 103.

In a structure of the system bandwidth 103 on the time domain with reference to FIG. 1B, the system bandwidth 103 of FIG. 1A indicates a system bandwidth 111 of FIG. 1B. The time domain resources in the LTE system include a radio frame 113 having a length of 10 msec, each radio frame 113 consists of ten subframes 117 having a length 1 msec, and each subframe 117 consists of two slots 105 having a length of 0.5 msec.

Each subframe 117 is divided into a control channel region 121 and a data channel region 123 on the time domain. The control channel region 121 is first transmitted before a first slot of the subframe, and the data channel region 123 is transmitted over first and second slots after the control channel region 121. A PSS/SSS 107 is transmitted in first frames of subframes #0 and #5, and has a structure in which the SSS first appears and then the PSS appears as illustrated in FIG. 1B. A PBCH 109 is transmitted in a second slot of subframe #0. Time positions and frequency positions of the PSS, the SSS, and the PBCH are very important in the initial access of the UE.

Figure 2:
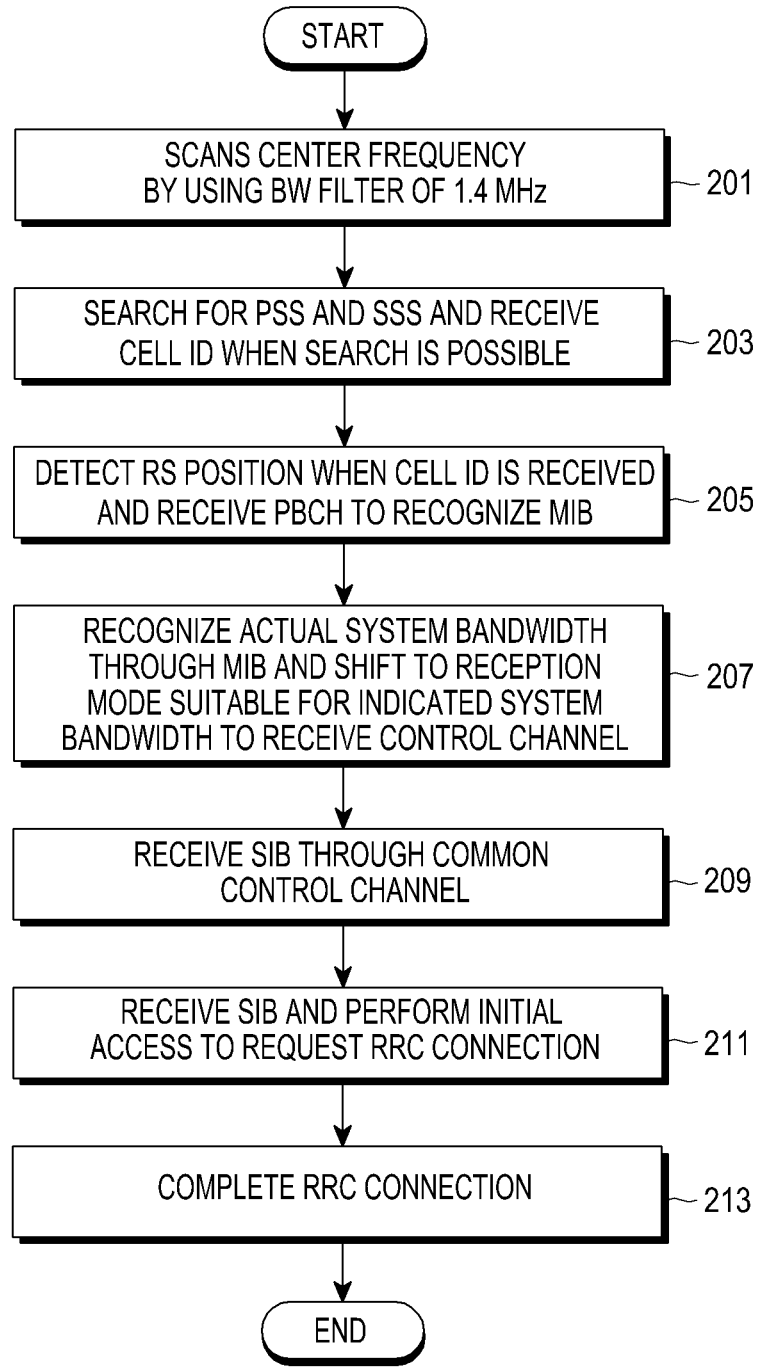
FIG. 2 illustrates an initial access process through a system bandwidth in a mobile communication system.

FIG. 2 illustrates an initial access process of the mobile communication system.

Referring to FIG. 2, the UE starts scanning from a center frequency by using a reception filter of 1.4 MHz corresponding to a minimum bandwidth in order to know a size of the currently accessing system bandwidths 103 and 111 in step 201. The scanning corresponds to a process of acquiring a cell identity and system information. In step 203, the UE searches for the PSS in a signal received in the band of 1.4 MHz based on the center frequency. The PSS includes three signals, and the UE recognizes a signal having high correlation from the three signals. Since the PSS is located in a boundary between slots, time information in the unit of 5 msec also can be acquired by receiving the PSSs having an interval of 5 msec.

When the PSS is searched, the UE analyzes the SSS received just before the PSS. The SSS includes a total of 157 signals, and similarly, the UE recognizes a signal having the highest correlation from the 157 signals. By receiving the SSS, the UE recognizes the cell identity of the eNB and a symbol length. The SSS transmitted in subframe #0 and the SSS transmitted in the subframe #5 have different contents, so that the UE can distinguish an order and a position of each subframe by receiving the SSSs.

In step 205, the UE performs a channel estimation by recognizing the cell identity, and demodulates the PBCH 109 transmitted after the PSS. The PBCH includes main system information MIB, and the MIB representatively includes information on the system bandwidth 103 and information necessarily required for demodulating the control channel of the control channel region 121. In step 207, the UE modifies an operation of a UE receiver to fit to the system bandwidth 103 by using the information on the system bandwidth 103 received in the PBCH, and receives another channel. The demodulation of the control channel is associated with the system bandwidth 103 and the information received in the PBCH, so the control channel may be demodulated only after the PBVH is correctly received.

After receiving the PBCH, the UE receives a System Information Block (SIB) in step 209. That is, the eNB informs of a position where the SIB is transmitted through the control channel, and the UE acquires system information for connection with the eNB by receiving the SIB. The UE exchanges a signal for accessing a network with the eNB by using the system information in step 211, and completes the access to the network through communication between the UE and the eNB in step 213.

The above described initial access process of the UE is identically applied to a high-capability UE supporting a plurality of cells. The high-capability UE supports a wider bandwidth, and thus manufacturing costs of the UE are increased and an energy problem is generated.

Figure 3:
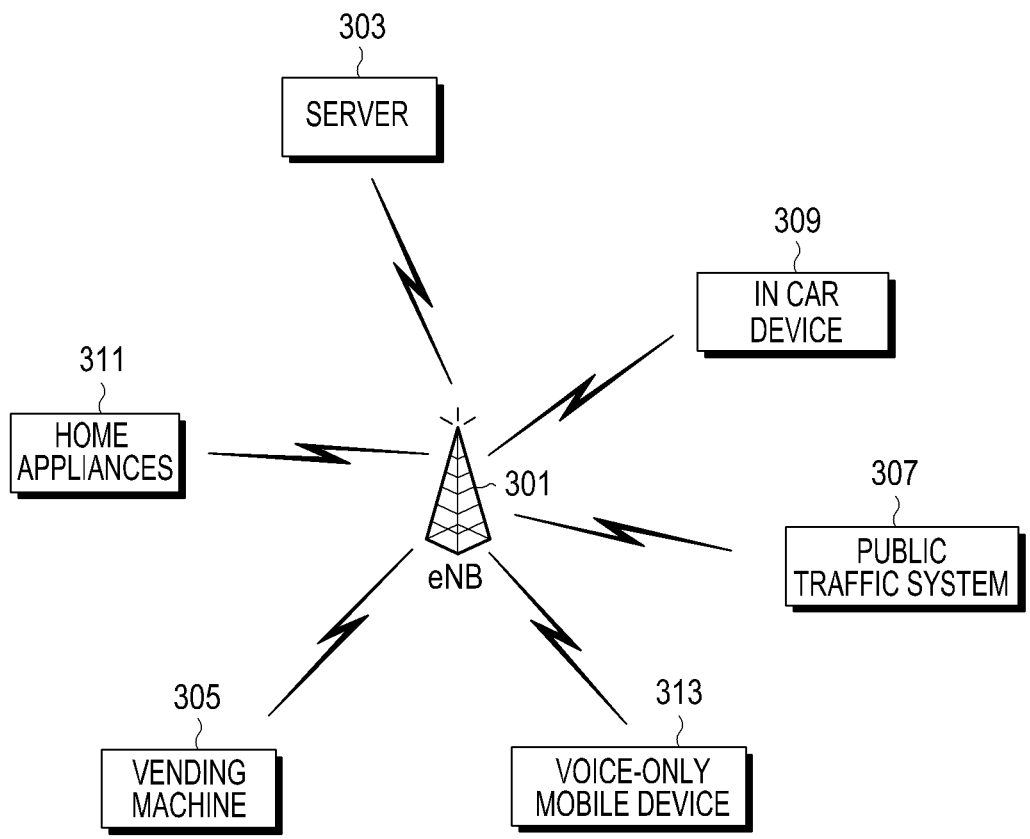
FIG. 3 illustrates an operation scenario for saving energy in a mobile communication system.

FIG. 3 illustrates an operation scenario for saving energy in the mobile communication system.

As illustrated in FIG. 3, an expansion of a communication area is applied up to communication between machines, to enable communication among a fixed machine such as a vending machine 305, backbone networks such as a public traffic system 307 and a in-car device (car built-in communication module) 309, home appliances (in-home devices) 311, and a server 303 supporting the same. An eNB 301 services communication by the above-listed devices 305, 307, 309, 311, and 313 through support of a server 303. Further, a UE (or voice-only mobile device) 313 is manufactured only for voice, and thus used for communication of low power and low costs with limited capability.

The disclosed technology allows the UE supporting a narrower bandwidth than the system bandwidth to access the cell supporting a high capability and having a wider system bandwidth, and discloses a method of operating the eNB and a signaling method in which one eNB simultaneously supports a transmission/reception operation of the UE, and UEs having different bandwidths. Further, a method of transmitting/receiving a channel between the eNB and the UE to reduce energy consumption is disclosed, and allows compatibility with a legacy LTE UE to be maintained, and hardware costs of the UE and energy consumption to be reduced.

Figure 4A:
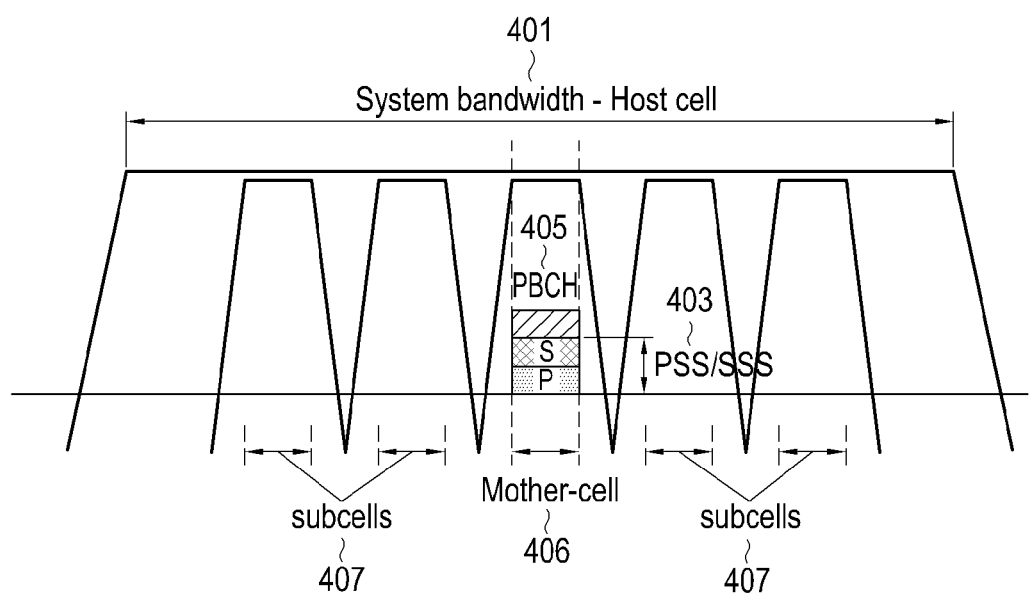
FIGS. 4A and 4B illustrate a frequency band within a multi-band and multi-cell system and a frame structure according to an embodiment of the present invention.
Figure 4B:
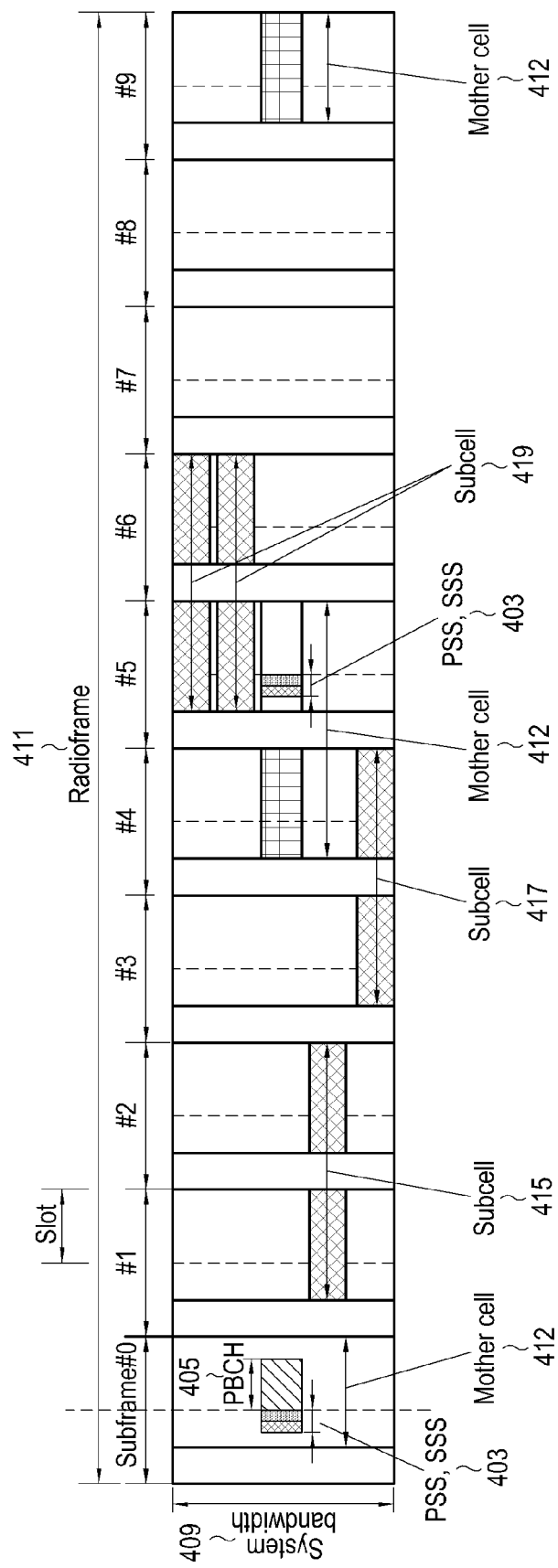

FIGS. 4A and 4B illustrate a frequency band and a frame structure of a multi-band and multi-cell system according to an embodiment of the present invention.

Referring to FIG. 4A, the eNB supports a plurality of bands 407 having a narrower bandwidth than that of a system band 401 used by the cell of the legacy LTE system. The cell supporting the system band 401 of the legacy LTE system is referred to as a host cell, and indicates a cell operated for the legacy LTE UE by the eNB. In the host cell, a PSS/SSS 403 and a PBCH 405 are transmitted in the center of the system band 401 corresponding to the 1.4 MHz band similarly to the conventional art.

The cell supporting the band 407 having the narrower bandwidth than that of the system band 401 is referred to as a cell for supporting communication between narrow-band UEs, that is, a narrow-band cell or a freeloader cell, and the freeloader cell is divided into a mother cell (or a freeloader mother cell) and a subcell (or a freeloader subcell). The narrow-band UE (or a freeloader cell UE) indicates a UE configured to receive only a narrower bandwidth than the system bandwidth of the host cell, without receiving the system bandwidth of the host cell, by considering energy consumption and manufacturing costs.

The freeloader mother cell is first accessed by the narrow-band UE, and is always supported by the eNB. The freeloader subcells are cells which are disposed on the remaining system band 401 based on the freeloader mother cell and configured to support a smaller band, and each freeloader subcell may be generated or removed by the eNB as necessary. The band 406 of the freeloader mother cell corresponds to the center band of 1.4 MHz in which the PSS/SSS 403 and the PBCH 405 of the host cell are transmitted, and the band 407 of each freeloader subcell is smaller than the system band 401 of the host cell and is equal to or larger than the band 406 of the freeloader mother cell.

In order to prevent interference between freeloader cells, bands of the freeloader cells are disposed with an interval (that is, a gap) therebetween on the frequency domain. A frequency interval between the freeloader cells may be determined according to an eNB implementation, and for example, has a value equal to or smaller than 108 KHz. The freeloader cells may be distinguished according to a frequency band and a subframe position on the time domain. Hereinafter, a frequency band allocated to the mother cell is referred to as a mother cell band, and a frequency band allocated to the subcell is referred to as a subcell band.

Referring to FIG. 4B, resources of the freeloader cells are allocated within a radio frame 411 and a system band 409. A freeloader mother cell 412 uses the bandwidth of 1.4 MHz in which the PBCH 405 of the host cell is transmitted on the frequency domain. The UE of the host cell can always receive subframes #0, #4, #5, and #9 where system information and a paging signal are transferred. The eNB can transmit the system information and the paging signal for the freeloader mother call 412 in the center band of 1.4 MHz of subframes #0, #4, #5, and #9. That is, the freeloader mother cell 412 may be allocated at the same timing (that is, to the same subframes) as that of subframes where the system information and the paging signal of the host cell are transmitted.

Freeloader subcells 415, 417, and 419 are for a data channel, and the narrow-band UE having initially accessed the freeloader mother cell acquires information on one of frequency bands used as freeloader cells and information on a position of a subframe which should be received in a corresponding freeloader cell band through Radio Resource Control (RRC) connection, and receives a control channel in the corresponding position. A data channel of each freeloader cell is transmitted in a subframe position subordinate to the subframe position of the corresponding control channel. For example, the data channel may be located in a subframe just next to the subframe in which the corresponding control channel is located. For another example, the data channel may be located in a subframe after the predetermined number of subframes from the subframe in which the corresponding control channel is located.

FIG. 4B illustrates an example in which the control channel and the data channel are located in two consecutive subframes.

For example, when four narrow-band UEs access the eNB, all four first access the freeloader mother cell to establish the RRC connection. Information on the freeloader mother cell band and timing is known to the UEs in advance. The first of the four UEs acquires information on the band 415 of the freeloader subcell and a control channel region allocated to subframe #1 through an RRC signaling, and receives the control channel in subframe #1 and the data channel in subframe #2. The second UE may be instructed to use the band 417 of the freeloader subcell different from that of the first UE and a different subframe through the RRC signaling of the freeloader mother cell. The third and fourth UEs may be instructed to use the control channel region allocated to the band 419 which is the same timing subframe but different bandwidth.

Although FIGS. 4A and 4B illustrate the example for reducing energy consumption in the UE by receiving and demodulation the control channel and temporally continuing operations for driving a data channel receiver, the arrangement of such channels does not limit the present invention.

As described above, the eNB indicates band positions of freeloader cells and subframe indexes for control channel reception to the UE through the RRC signaling, and the UE receives the indication to receive only a corresponding band in which the allocated freeloader cell exists and the subframe, not an entire host cell. In other words, each freeloader cell is generated restrictively to a particular frequency band and a particular subframe. For example, the band of the freeloader cell may be configured to have a bandwidth equal to or wider than the minimum bandwidth of 1.4 MHz of the host cell. The eNB indicates a bandwidth which the UE can receive among available bandwidths for the freeloader cells, or the eNB may allocate a bandwidth to the UE by receiving information on a desired bandwidth from the UE and then approving the corresponding bandwidth through the RRC signaling.

Figure 5:
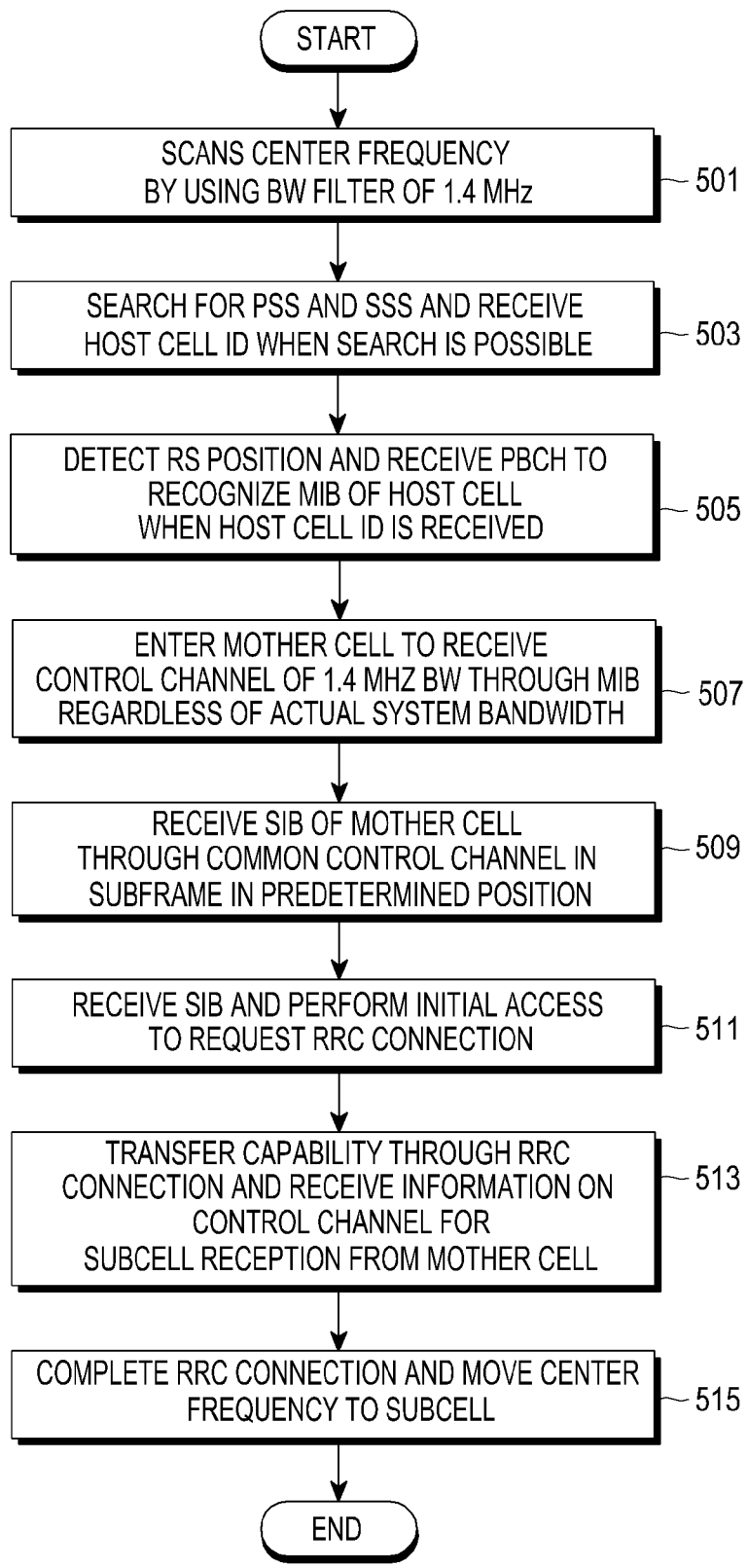
FIG. 5 illustrates an initial access process according to an embodiment of the present invention.

FIG. 5 illustrates an initial access process of the UE according to an embodiment of the present invention. An operation of the narrow-band UE configured to receive the bandwidth of the freeloader cell will be described.

Referring to FIG. 5, the UE searches for a frequency for detecting a signal of the host cell through a reception filter of 1.4 MHz corresponding to the minimum bandwidth in step 501. In step 503, the UE recognizes a cell identity of the host cell by using the synchronization signal PSS/SSS acquired through the search for the frequency. In step 505, the UE acquires information on a reference signal for a channel estimation by using the cell identity, and receives the MIB of the host cell through the broadcasting channel PBCH. The UE recognizes the system bandwidth of the host cell through the MIB. However, since the UE cannot support the system bandwidth of the host cell, the UE determines that it is connected to the freeloader cell and proceeds to step 507.

In step 507, the UE accesses the freeloader mother cell allocated to the center band of the system bandwidth. A region where the system information is transmitted in the mother cell is predetermined. For example, when the frame structure of FIG. 4B is applied, the system information is transmitted through the data channel region of the host cell among subframes #0, #4, #5, and #9. The UE receives the SIB corresponding to the system information through the mother cell in step 509, and transmits an initial access signal and an RRC connection request signal together with information on a capability of the UE to the eNB through the mother cell to establish the RRC connection in step 511.

In step 513, the UE receives the bandwidth and position of the freeloader subcell designated by the eNB to fit the capability of the UE, and information on the position of the subframe where the control channel of the freeloader subcell is transmitted, from the eNB through the RRC connection of the mother cell. In step 515, the UE stops the RRC connection, and modifies the center frequency of the reception filter to the band of the freeloader subcell instructed by the eNB. Thereafter, the UE performs communication with the eNB through the instructed freeloader subcell.

Figure 6:
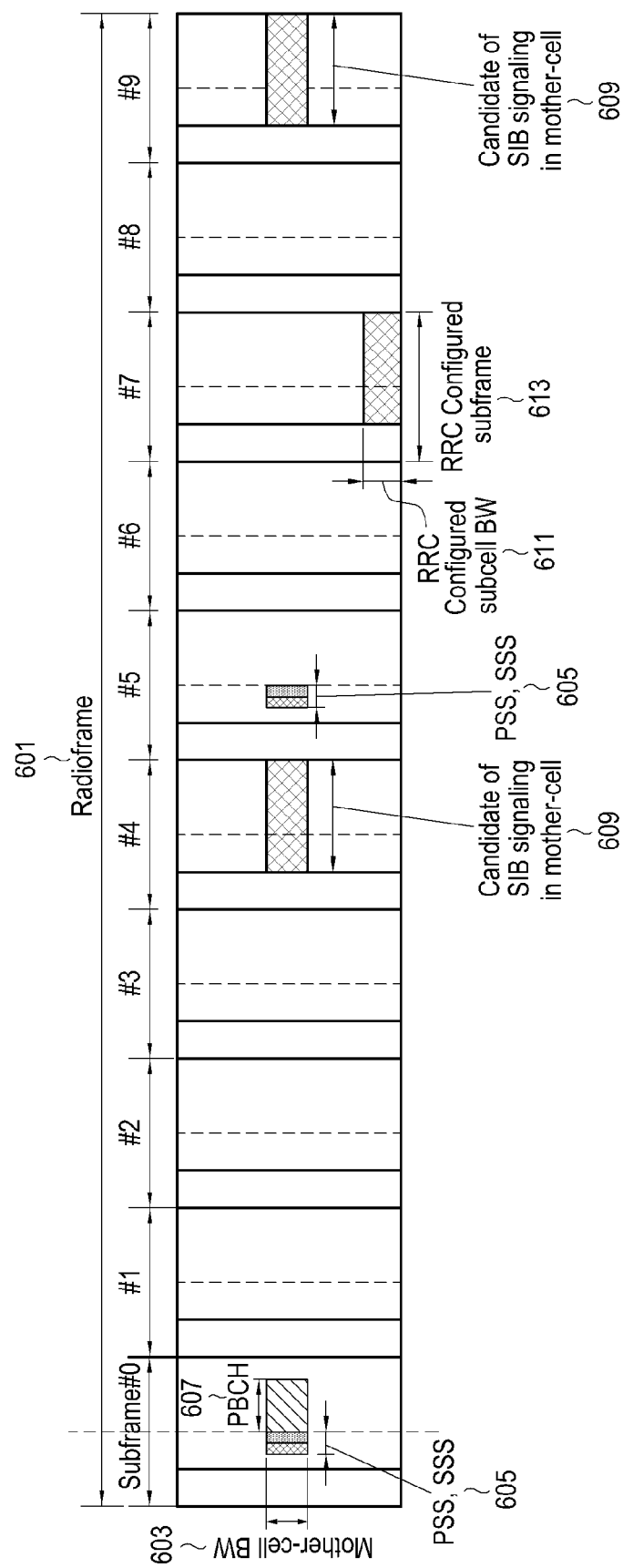
FIG. 6 illustrates transmission/reception timing of an initial access signal according to an embodiment of the present invention.

FIG. 6 illustrates transmission/reception timing of the initial access signal according to an embodiment of the present invention. The signal transmission timing at which the narrow-band UE configured to access the freeloader cell accesses the freeloader mother cell to acquire system information will be described in detail.

Referring to FIG. 6, the UE acquires system information transmitted from a freeloader mother cell 603 in order to enter the freeloader mother cell 603 having a narrow bandwidth within the host cell. Since the legacy LTE UE has to receive all subframes within a radio frame 601, the legacy LTE UE can receive a control channel for system information transmission only when a timeframe passes after a PSS/SSS 605 and a PBCH 607 are received. However, receiving all subframes causes continuous power consumption of the UE. Since the narrow-band UE supporting the freeloader cell does not receive scheduling from all subframes, it is preferable that the narrow-band UE operates with minimum power. Accordingly, the narrow-band UE attempts to receive the system information by operating only pre-designated subframes, for example, subframes #4 and #9 609 among subframes #0, #4, #5, and #9 which must be received.

The eNB transmits the system information in pre-designated subframes, that is, subframes #4 and #9. The initially-accessing UE continuously monitors subframes #0 and #5 in order to receive the PSS/SSS, and can consecutively use reception power for two consecutive subframes since subframes #4 and #9 appear before subframes #0 and #5. Accordingly, power consumption is reduced in comparison with when two subframes separated from each other are received. That is, through the transmission of the system information by the eNB using subframes #4 and #9, the number of times that the UE turns on and off reception power is decreased and thus power consumption of the UE may be reduced.

After receiving the system information in subframes #4 and #9, the UE establishes the RRC connection through the band of the freeloader mother cell, and receives information on a band 611 of the freeloader subcell and a subframe 613 through the RRC connection. As described above, subframes #4 and #9 of the freeloader mother cell 603 are used for receiving the control channel for the RRC connection as well as for transmitting the control channel for system information transmission and the control channel for paging.

The control channel reception of the UE and associated data channel transmission are achieved on a radio frame cycle, so that transmission and reception of the UE are not simultaneously performed, and the data channel and the control channel are not simultaneously generated. As described above, since the transmission the reception are not simultaneously performed, the UE may be configured to have a half duplex structure and thus implementation complexity and costs may be reduced. Further, since the data channel and the control channel are not simultaneously generated, reception capability of the control channel is improved.

Figure 7:
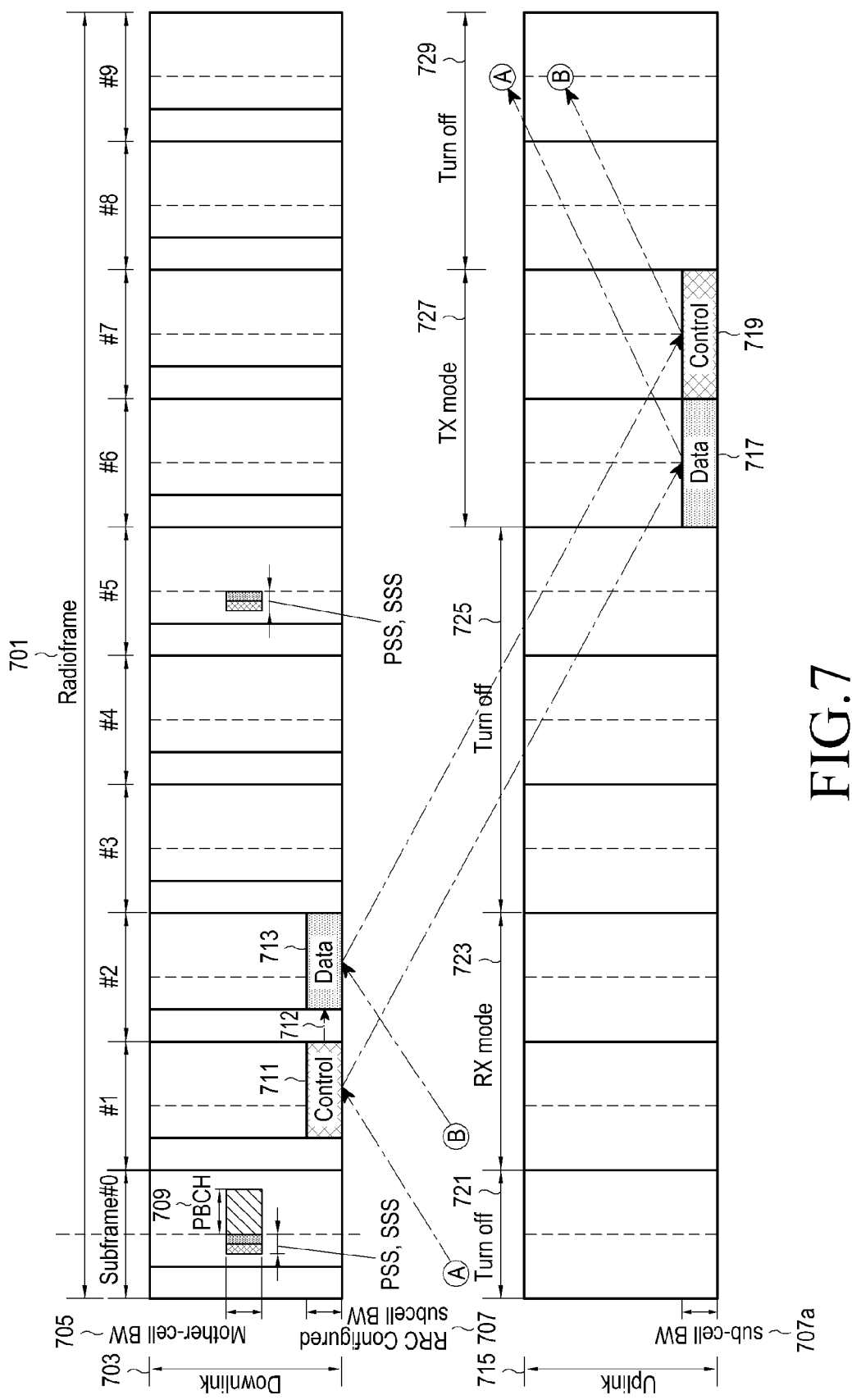
FIG. 7 illustrates transmission/reception timing of a control channel and a data channel according to an embodiment of the present invention.

FIG. 7 illustrates transmission/reception timing of the control channel and the data channel according to an embodiment of the present invention. Although Frequency Division Duplex (FDD) where an uplink and a downlink are distinguished on the frequency band is illustrated, it should be noted that a similar operation may be applied to Time Division Duplexing (TDD). A radio frame 701 consists of a plurality of subframes within each of a downlink band 703 and an uplink band 715, and a PBCH 709 is transmitted in a pre-designated subframe, for example, subframe #0.

Referring to FIG. 7, the UE acquires information on a band 707 of the freeloader subcell which the UE is to access and information on subframe #1 including a control channel region 711 from a freeloader mother cell 705 through the RRC signaling, and receives information on downlink scheduling, uplink scheduling, and a system information update through subframe #1 including the control channel region 711 in the band 707 of the freeloader subcell within the downlink band 703. Subframe #1 including the control channel region 711 can transmit the control channel for downlink data transmission and the control channel for the uplink. In downlink transmission, the data channel is transmitted in subframe #2 including a data channel region 713 after an interval 712 after the control channel transmission in subframe #1 including the control channel region 711 is started. The data channel transmission is scheduled by considering channel states of the UE in all or some of the data channel regions.

After the number of subframes, for example, four subframes from downlink data reception through subframe #2 including the data channel region 713, the UE transmits a response channel for the downlink data channel of the subframe 713 through subframe #7 including a response channel region 719 in subcell band 707a within the uplink band 715. That is, subframe #7 including the response channel region 719 corresponds to a fifth frame after subframe #2 including the data channel region 713. The subcell band 707a of the uplink may be disposed on the same position as that of the subcell band 707 of the downlink, within the uplink band 715. The response channel region 719 within uplink subframe #7 may be allocated or designated according to a conventional LTE rule. When the response channel is transmitted through the response channel region 719, the eNB transmits retransmission data or new data through a next data channel region according to a response of the response channel. The retransmission data or the new data is transmitted in downlink subframe #2 of a next radio frame after four subframes from the response channel region 719.

The control channel region 711 is allocated to the same position (that is, subframe #1) as that of the downlink control channel, within the uplink band 715, and the UE transmits uplink data in uplink subframe #6 after five subframes from the control channel region 711. The eNB transmits the response channel for the uplink data of the UE in a fifth frame (that is, downlink subframe #1 of the next radio frame) from subframe #6 where the uplink data is received.

Timing of the downlink data transmission and the uplink data transmission according to the embodiment of FIG. 7 is defined as follow.

1. Downlink

Data reception timing (*i*)=control channel reception timing (*j*)+*p* msec

Response channel transmission timing (*l*)=data reception timing (*i*)+*p*' msec Control channel reception timing (*j*)=response channel transmission timing (*l*)+*p*'' msec

*p*+*p*'+*p*''=10 msec, wherein *p*>0 msec and *p*', *p*''>=4 msec

2. Uplink

Data transmission timing (*j*)=response or control channel reception timing (*j*)+*k* msec Response channel transmission timing (*l*)=data transmission timing (*i*)+*k*' msec

*k*+*k*'=10 msec, wherein *k*, *k*'>=4 msec

The i, j, and l denote subframe indexes within the downlink band or the uplink band, and p, p', p'', k, and k' may be predetermined values, respectively.

The eNB transmits the data channel in a data channel region 713 disposed after an interval 712 from transmission of a control channel region 711 in a downlink band 703. The UE having received the control channel in the control channel region 711 receives the data channel in the data channel region 713 after the interval 712. The control channel region 711 and the data channel region 713 are located in two different subframes, respectively.

When the control channel and the data channel coexist in one subframe, the UE cannot know an actual scheduling position of the data channel while receiving and demodulating the control channel, and accordingly can demodulate the actually scheduled data after storing data of an entire band and completing demodulation of the control channel. That is, a receiver should store all data of the entire band, which causes a size increase of a required buffer.

When the control channel region 711 and the data channel region 713 have the margin time interval 712, the UE has sufficient time to demodulate the control channel, and thus can receive only a signal of the actually scheduled resource among the data channel. Further, the control channel region 711 and the data channel region 713 are separated as different subframes #1 and #2 in the downlink 703, and similarly a data channel region 717 and a control channel region 719 corresponding to the control channel region 711 and the data channel region 713 are separated as different subframes #6 and #7 in the uplink 715. When the data channel and the control channel coexist in the uplink, compensation for meeting different reception requirement capabilities between two channels is required. Since the compensation requires more resources, a reception capability of the data channel is deteriorated. Accordingly, this problem is prevented when the control channel region is separated as a different subframe.

The control channel region 711 and the data channel region 713 of the downlink 703 use two consecutive subframes, and similarly the control channel region 717 and the data channel region 713 of the uplink 715 use two consecutive subframes. The UE can ensure the same transmission rate as that of the legacy LTE UE and reduce power consumption up to 25% by turning off the receiver in sections 721, 725, and 729 where transmission/reception is not performed, and operating the receiver only at sections 723 and 727 where the transmission/reception is performed. Sections 723 and 727 where the transmission/reception is performed do not temporally overlap between the uplink and the downlink, and thus transmission and reception of the UE are not simultaneously performed. Accordingly, a duplexer which should separate a transmission signal and a reception signal when the UE is designed is not required, thereby efficiently implementing a low-cost UE.

That is, in the embodiment of FIG. 7, since the control channel is not simultaneously transmitted with the data channel (in the same subframe) and a transmission cycle including transmission of the control channel, the data channel corresponding to the control channel, and the response channel for the data channel is equally set to a cycle of the radio frame, the transmission and the reception are not simultaneously generated.

In the above embodiment, the transmission cycle of the control channel and the data channel is the same as the cycle of the radio frame, and the control and the data channel are not simultaneously generated. The downlink control channel and the uplink control channel may be simultaneously generated, as well as the downlink data channel and the uplink data channel.

Figure 8:
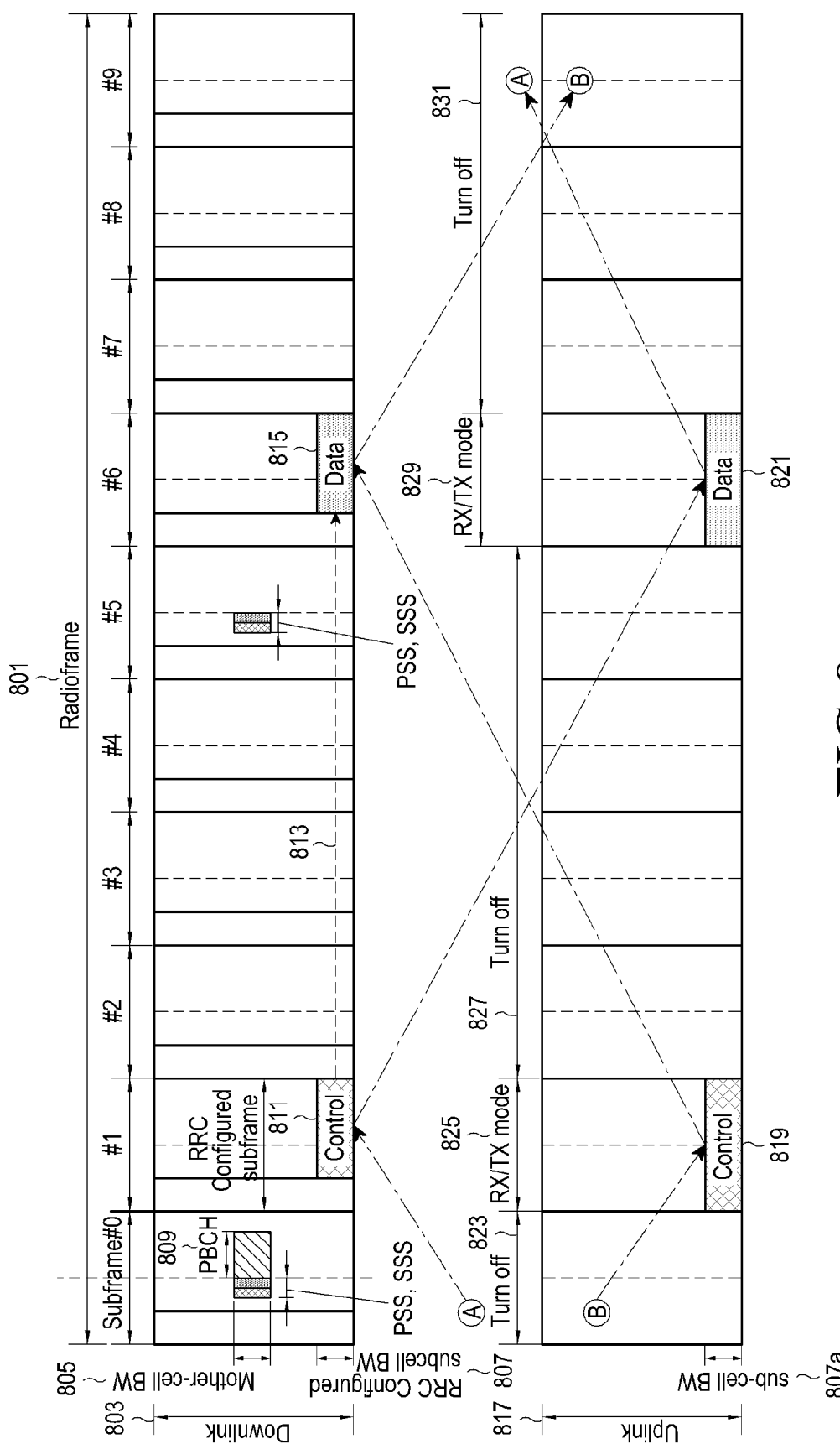
FIG. 8 illustrates transmission/reception timing of a control channel and a data channel according to another embodiment of the present invention.

FIG. 8 illustrates transmission/reception timing of the data channel and the control channel according to another embodiment of the present invention. Although FDD is illustrated, it should be noted that a similar operation may be applied to TDD. A radio frame 801 consists of a plurality of subframes in each of a downlink band 803 and an uplink band 817, and a PBCH 809 is transmitted in a pre-designated subframe, for example, subframe #0.

Referring to FIG. 8, the UE accesses a freeloader mother cell 805 to acquire information on a band 807 of the freeloader subcell and subframe #1 including a control channel region 811 through the RRC signaling, and attempts to demodulate a control channel region 811 in the band 807 of the freeloader subcell within a downlink band 803. When the UE succeeds the demodulation of the control channel region 811, the UE receives the data channel in a scheduled position within the data channel region 815 after a time interval 813. For example, data reception is achieved after 5 msec from control channel reception. Further, a response to the data of the data channel region 815 is transmitted in an uplink control channel region (not shown) of a next radio frame after five subframes from the data channel region 815.

Within an uplink band 817, the UE transmits the data channel in subframe #6 including an uplink data channel region 821 after five subframes from control channel reception for the uplink data channel in subframe #1 including the downlink control channel 811. The eNB receives the data of the data channel region 821, and transmits a response for the data of the data channel region 821 in downlink subframe #1 of the next radio frame after subframe #5.

That is, in the embodiment of FIG. 8, the control channel and the data channel are not simultaneously transmitted, and uplink and downlink channels are simultaneously transmitted (in the same subframe). That is, the uplink control channel and the downlink control channel are transmitted in the same subframe, as well as the uplink data channel and the downlink data channel.

Data is generated in the UE in the unit of 10 msec, and one data transmission is possible in every 10 msec in the frame structure, so that the UE continuously transmits newly generated data regardless of the success of previous data transmission. Accordingly, in the above described frame structure, retransmission of the eNB and the UE is not required, thereby reducing loads for the retransmission. In general, the data channel generates a total of four redundancy version packets when using a turbo coding. However, in the illustrated frame structure, the retransmission is not required, and thus storing of the redundancy version packets is not required, thereby reducing a size of a memory within the UE by ¼. The embodiment illustrates the frame structure for a low-speed UE and a stationary UE which do not require the retransmission, and the eNB can re-transmit the previous packet at a low coding rate when transmission fails.

Further, since the downlink control channel region 811 and the uplink control channel region 819 are simultaneously generated time and the control channel for the data channel region 815 and the control channel 815 for the data channel region 821 are simultaneously generated, the UE has only to perform transmission/reception of 2 msec during the radio frame 801 of 10 msec. The UE can turn off the receiver in sections 823, 827, and 831 where transmission/reception is not performed, and operate the receiver in section 825 and 829 where the transmission/reception is performed. Accordingly, the illustrated frame structure consumes only power of 20% in comparison with the legacy UE, and reduces power by 50% in comparison with the embodiment of FIG. 7.

Timing of the downlink data transmission and the uplink data transmission according to the embodiment of FIG. 8 is defined as follows.

1. Downlink

Data reception timing ($i$)=control channel reception timing ($j$)+$p$ msec

Response channel transmission timing ($l$)=data reception timing ($i$)+$p'$ msec Control channel reception timing ($j$)=response channel transmission timing ($l$)+$p''$ msec $p+p'+p''=10$ msec, wherein $p''=0$ msec, $p$, $p''>=4$ msec 2. Uplink Data transmission timing ($j$)=response control channel reception timing ($j$)+$k$ msec Response channel transmission timing ($l$)=data transmission timing ($i$)+$k'$ msec $k+k'=10$ msec, wherein $k$, $k'>=4$ msec $p=k$, $p'=k'$ The $i$, $j$, and $l$ denote subframe indexes within the downlink band or the uplink band, and $p$, $p'$, $p''$, $k$, and $k'$ may be predetermined values, respectively.

Figure 9:
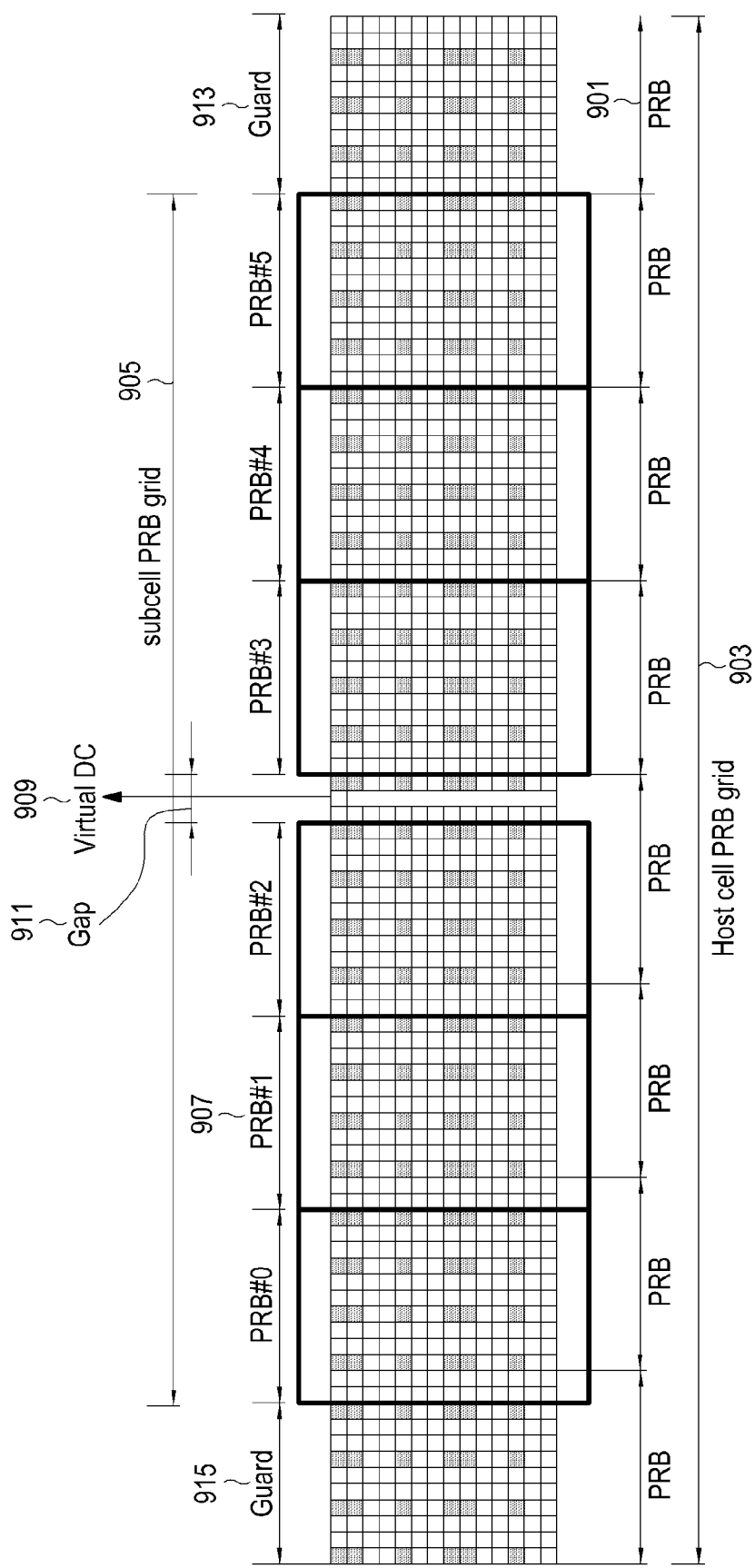
FIG. 9 illustrates a configuration of resources of a multi-band according to an embodiment of the present invention.

FIG. 9 illustrates a configuration of resources of a multi-band according to an embodiment of the present invention. In the illustrated embodiment, the eNB allocates three subcarriers to a center frequency 909 in order to secure the virtual center frequency 909 for the subcell and secure a reference for PRBs in both sides of the center frequency 909.

Referring to FIG. 9, a host cell PRB grid 903 illustrates a band, to which the freeloader cell among the frequency band of the host cell is allocated, in the unit of PRBs, and consists of eight RPBs 901. When the bandwidth of the freeloader cell is 1.4 MHz, a total of six PRBs 907 may be allocated for the freeloader cell, and the six PRBs 907 configure a freeloader subcell PRB grid 905. PRB #2 and #3 adjacent to the center frequency 909 among the PRBs 907 allocated to the freeloader cell are spaced apart from the center frequency 909 by a gap 911. Guard bands 915 and 913 are secured in both edges of the freeloader subcell PRB grid 905, and are used for preventing interference for the UE in the host cell and simultaneously preventing the UE connected to the freeloader cell from receiving interference by the data channel transmitted to the host cell. Each of the guard bands 915 and 913 is preferably configured to have a size equal to or smaller than a PRB size.

In addition, the UE secures the center frequency 909 of each freeloader cell band. The eNB transmits no signal in the center frequency 909. When one subcarrier included in the host cell PRB grid 903 is used as the center frequency 909 of the freeloader cell band, some of the PRB regions of the host cell may not be used, and also resource positions (that is, patterns) of reference signals within the PRBs become different between the PRBs. Accordingly, in the illustrated embodiment, the freeloader subcell preferably has the center frequency 909 having a bandwidth of 45 KHz three times larger than a bandwidth of 15 KHz of one subcarrier. In other words, the center subcarrier of 15 KHz and subcarriers 911 as the guard bands of 15 KHz additionally located in both sides of the center subcarrier are set as the center frequency 909 of the freeloader subcell.

Since a wider frequency band than the conventional system is used as the center frequency 909 in the embodiment of FIG. 9, reference signals are disposed in the same pattern in both low resource regions and high resource regions based on the center frequency 909. Therefore, the UE can detect the reference signal in the same position in any resource region to estimate the channel.

Figure 10:
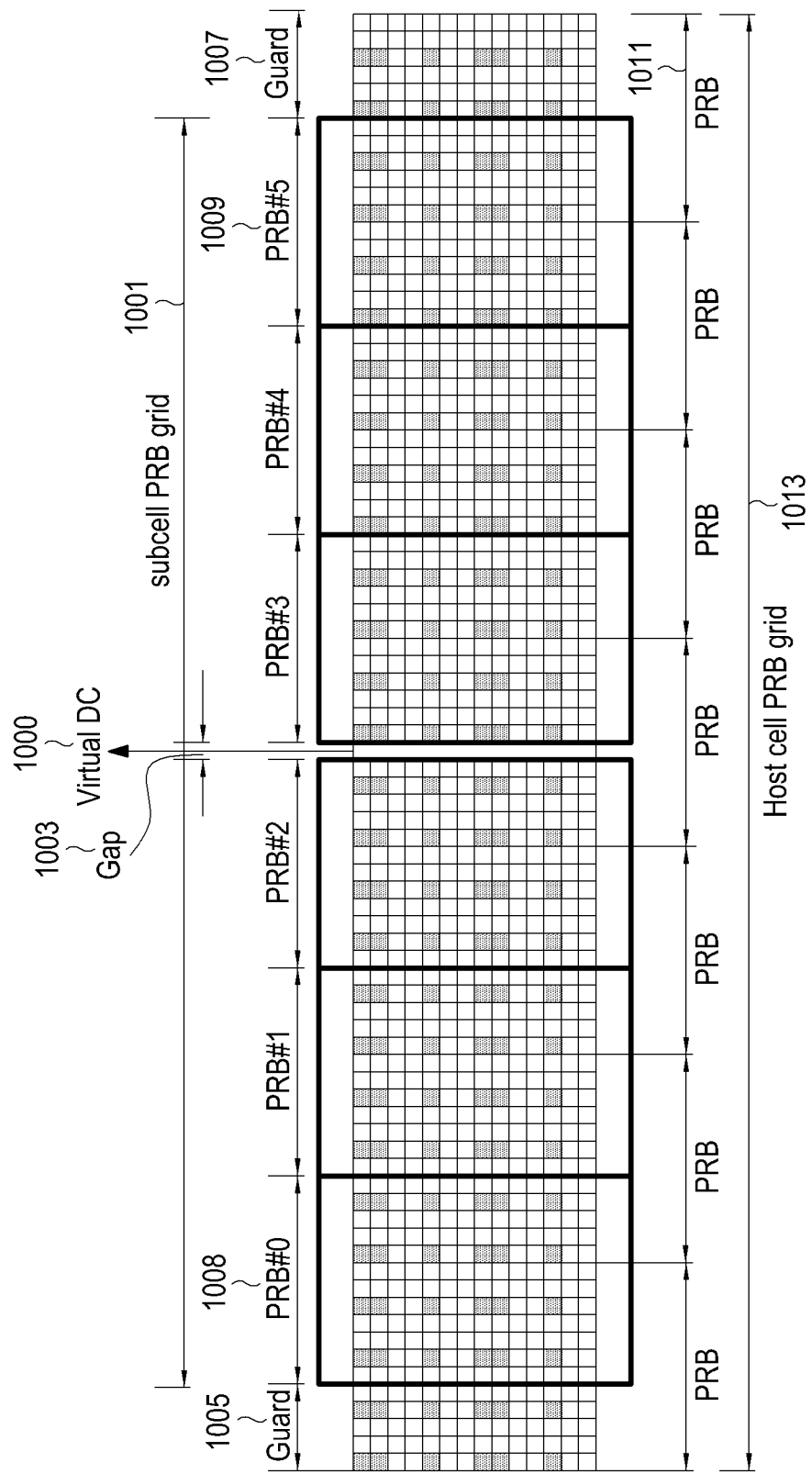
FIG. 10 illustrates resource allocation of a multi-band according to another embodiment of the present invention.

FIG. 10 illustrates a configuration of resources of a multi-band according to an embodiment of the present invention. In FIG. 10, the eNB secures a virtual center frequency 1000 for the subcell, and uses reference signals of different patterns in a low frequency band and a high frequency band based on the center frequency 1000.

Referring to FIG. 10, a host cell PRB grid 1013 consists of eight PRBs 1011 similarly to FIG. 9. The freeloader cell is allocated to six PRBs 1008 and 1009 configuring a freeloader subcell PRB grid 1001, and the six PRBs 1008 and 1009 have a gap 1003 from the center frequency 1000. Guard band 1005 and 1007 are secured in both edges of the freeloader subcell PRB grid 1001. The center frequency 1000 of the freeloader subcell PRB grid 1001 consists of one subcarrier of 15 KHz including the gap 1003. An offset for determining a pattern of the reference signal is equally set to the legacy LTE system, for example, [cell_ID modulo 6] in a resource region of the high frequency band based on the center frequency 1001, and the offset is differently set from the high frequency band 1009, for example, [cell_ID modulo (6+1)] in resource regions RPB #0, #1, and #2 1008 of the low frequency band. Such a reference signal arrangement of which a right side and a left side are asymmetrical has a structure of not influencing the channel estimation and resource allocation capability, and maximally using the both guard bands 1005 and 1007.

Figure 11:
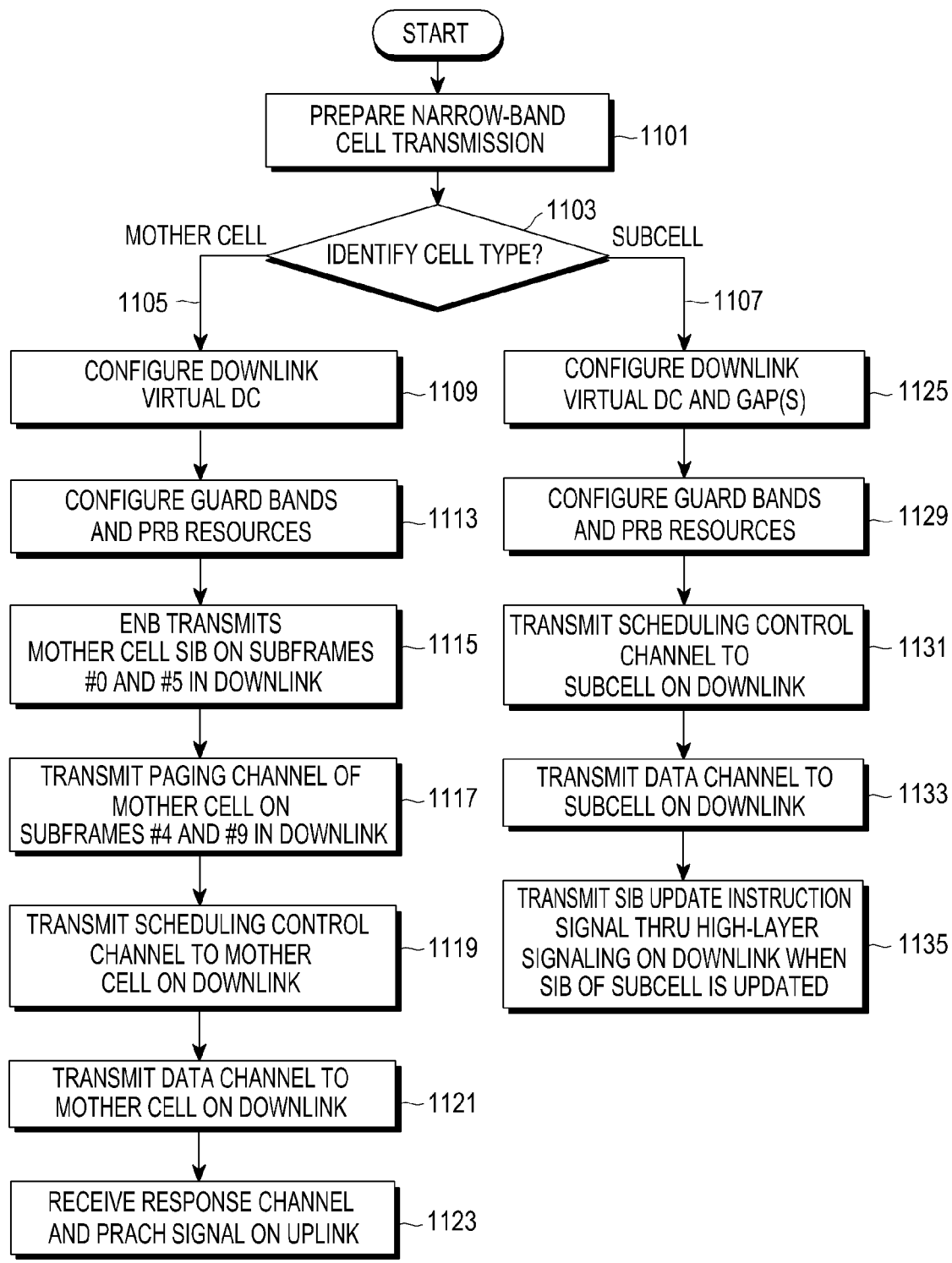
FIG. 11 illustrates a transmission process of an eNB according to an embodiment of the present invention.

FIG. 11 is a flowchart illustrating an operation of the eNB according to an embodiment of the present invention. A process in which the eNB configures a multi-band cell and allocating channels to the narrow-band UE is described.

Referring to FIG. 11, the eNB prepares transmission of at least one freeloader cell existing within a system band, by a scheduler of the host cell in step 1101. The eNB identifies a type of freeloader cell for each freeloader cell band available for transmission in step 1103. When a corresponding band is the freeloader mother cell, the eNB proceeds to step 1105. When the corresponding band is the freeloader subcell, the eNB proceeds to step 1107.

When the band is the freeloader mother cell, the eNB configures a downlink virtual Direct Current (DC) corresponding to the downlink center frequency of the freeloader mother cell equally to the center frequency of the host cell in step 1109. In step 1113, the eNB configures guard bands for the freeloader mother cell band, and configures PRBs which are the resource allocation units.

In step 1115, the eNB transmits the SIB corresponding to the system information for the freeloader mother cell through freeloader mother cell bands in prearranged subframes, for example, subframes #0 and #5. In step 1117, the eNB configures paging channels for the freeloader mother cell as necessary, and transmits the configured paging channels through freeloader mother cell bands in prearranged subframes, for example, subframes #4 and #9. When the UE is scheduled to the freeloader mother cell, the eNB transmits the control channel for scheduling of the UE through the freeloader mother cell band in step 1119. The control channel is transmitted in different subframes for each UE according to information on a position of the control channel subframe notified to the UE connected to the freeloader mother cell through the RRC signaling.

In step 1121, the eNB transmits or receives the data channel of the scheduled UE, which is transmitted in the frequency band instructed by the control channel of each UE, and reception/transmission timing (subframe) of the corresponding data channel corresponding to control channel reception is determined according to a rule.

When the downlink data channel is transmitted in step 1121, the eNB receives a response channel for the downlink data channel and a Physical Random Access CHannel (PRACH) corresponding to the initial access channel from the UE through the freeloader mother cell in step 1123. Reception timing of the response channel is determined according to transmission timing of the data channel by a rule, and reception timing of the initial access channel is indicated by the system information of the eNB.

In step 1125, the eNB configures a virtual DC which is the downlink center frequency of the freeloader subcell band for the band determined to be used as the freeloader subcell in step 1103. The center frequency may be configured, for example, according to FIG. 9 or 10. In step 1129, the eNB allocates PRBs configuring the freeloader subcell PRB grid based on the center frequency, and sets guard bands. Different PRB configurations may be used in a left band and a right band based on the center frequency according to the configuration of the center frequency.

When the UE is scheduled, the eNB transmits the control channel for each UE in subframes instructed through the RRC signaling among the freeloader band in step 1131. The eNB transmits the control channel and then transmits or receives the data channel in a subframe after an interval in the freeloader subcell band in step 1133. When the system information of one freeloader subcell is updated, the eNB transmits an update instruction signal of a high-layer signaling through the freeloader subcell instead of directly transmitting update information through the freeloader subcell, and instructs the UE to return to the freeloader mother cell in step 1135. The UE accesses the freeloader mother cell in response to the update instruction signal, and acquires the updated system information through the freeloader mother cell.

Figure 12:
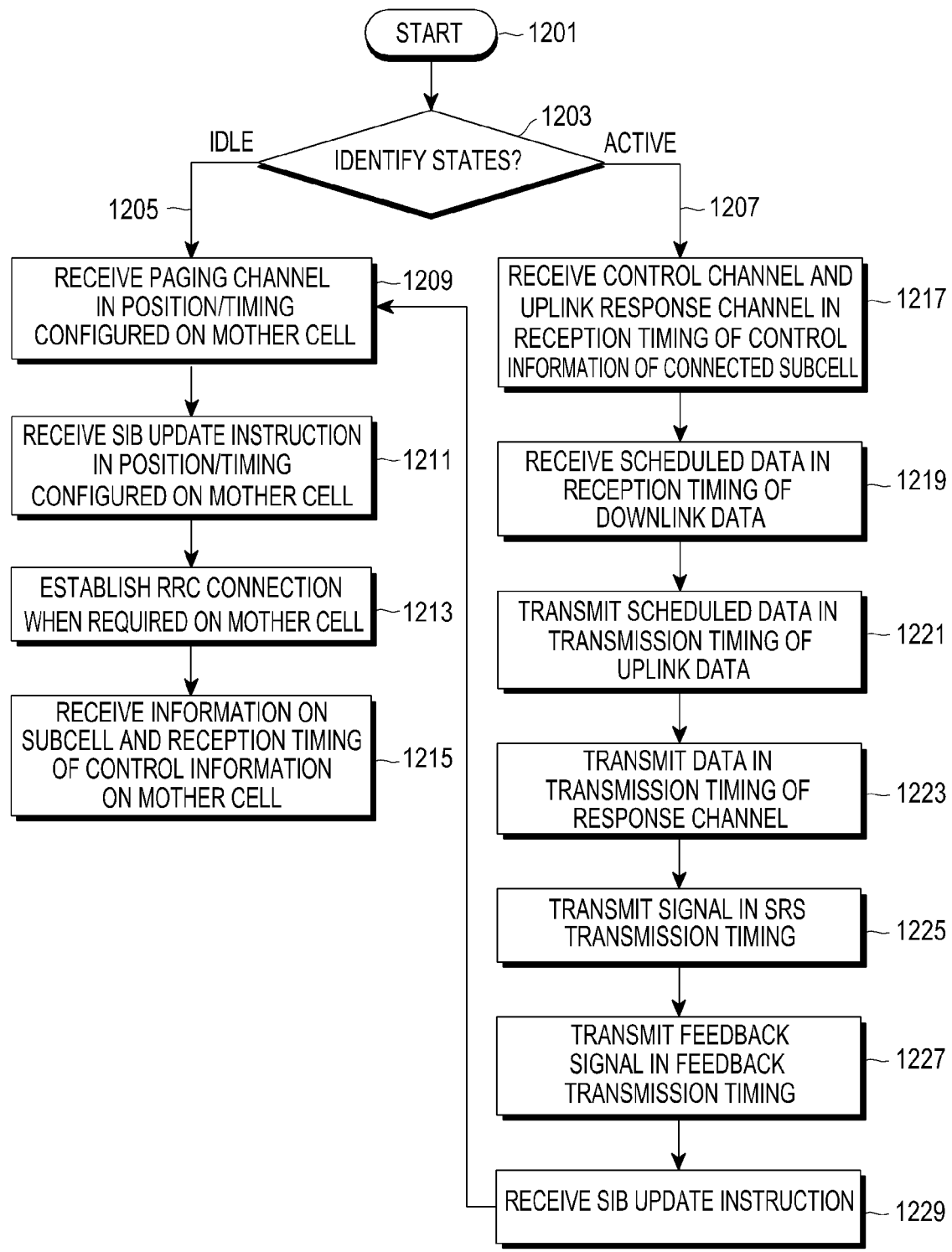
FIG. 12 illustrates a reception process of a UE according to an embodiment of the present invention.

FIG. 12 illustrates an operation of the UE according to an embodiment of the present invention.

Referring to FIG. 12, the UE determines whether the UE is in an idle mode or an active mode in step 1203. When the UE is in the idle mode 1205, the UE proceeds to step 1209. When the UE is in the active mode 1207, the UE proceeds to step 1217.

In step 1209, the UE in the idle mode detects a paging signal through the freeloader mother cell band in a timing of subframes #4 and #9, and recognizes that there is a call received by the UE. In step 1211, the UE detects the update instruction signal of the system information through the freeloader mother cell band in subframes #4 and #9, and receives the updated system information through the freeloader mother cell band when the update of the system information is required. The UE performs an RRC connection setting process through the freeloader mother cell band in order to re-enter the active mode as necessary in step 1213, and enters the active mode after receiving configuration information (frequency band) of the freeloader subcell and subframe position information for informing reception timing in the freeloader mother cell band through the established RRC signaling from the eNB in step 1215.

The UE having entered the active mode recognizes the band of the freeloader subcell which the UE should access and the subframe position information. Accordingly, the UE in the active mode receives the control channel in the subframe allocated to the freeloader subcell through the band of the freeloader subcell in step 1217. When the indication is made through the control channel, the UE receives the data channel through the freeloader subcell band according to the received control channel in step 1219. The reception timing (that is, subframe) of the data channel is determined relevantly to the reception timing of the control channel according to a rule. When the indication is made through the control channel, the UE transmits the data through the uplink data channel in step 1221. The transmission timing of the uplink data channel is determined relevantly to the reception timing of the control channel according to a rule.

In step 1223, the UE transmits a response channel for the downlink data reception. A transmission resource of the response channel is the same as that of the legacy LTE system, but transmission timing follows the aforementioned rule. In step 1225, the UE transmits a Sounding Reference Signal (SRS) for uplink channel estimation, and transmission timing of the SRS is determined by the system. In step 1227, the UE transmits feedback information such as channel quality information in feedback transmission timing determined according to a rule by the system. When the update instruction signal is received from the eNB, the UE moves to the freeloader mother cell to receive the updated system information in step 1229. When all transmission/reception of the UE is terminated, the UE enters into an idle mode.

Figure 13:
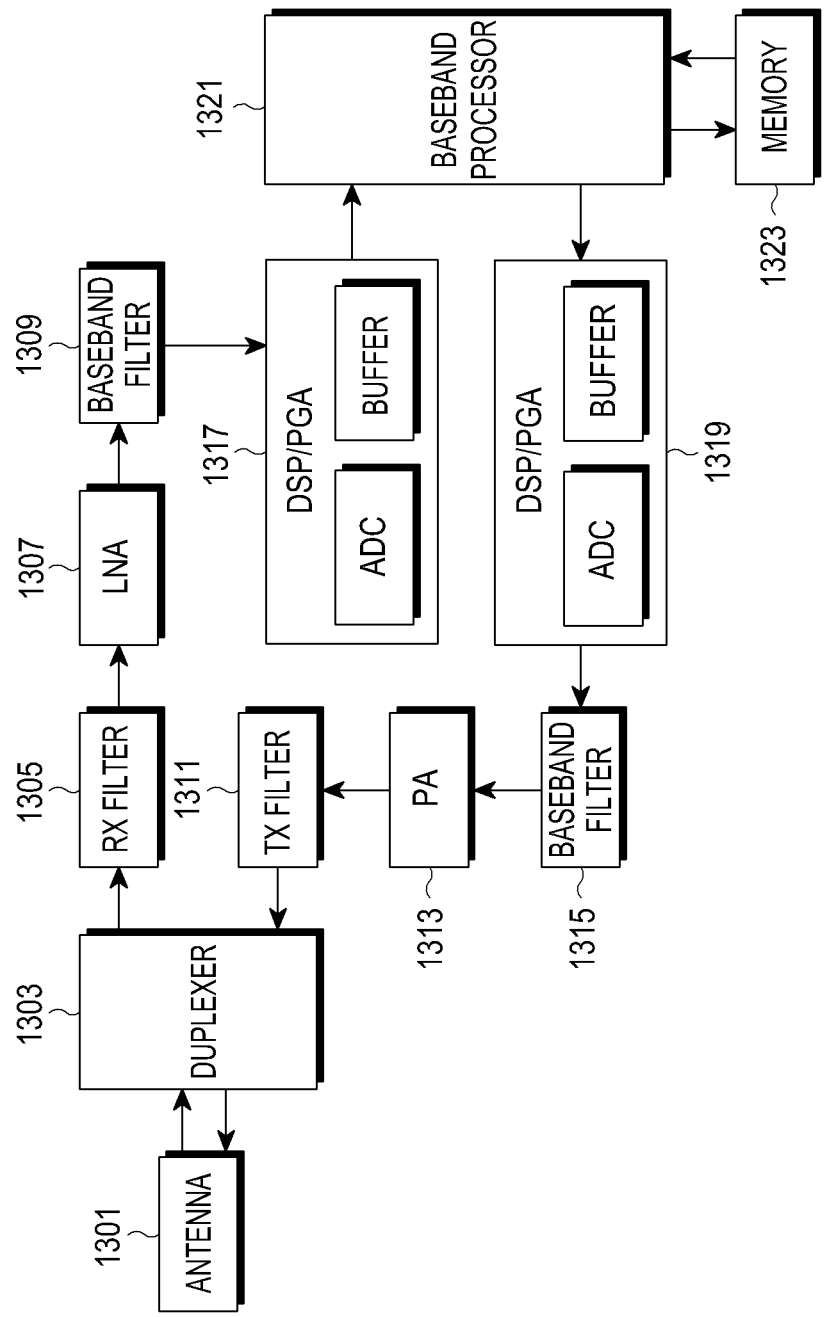
FIG. 13 illustrates a hardware configuration of a UE according to an embodiment of the present invention.

FIG. 13 illustrates a hardware configuration of the UE according to an embodiment of the present invention.

Referring to FIG. 13, an antenna 1301 transmits/receives a wireless signal, and a duplexer 1303 connects the antenna 1301 to a reception filter (RX filter) 1305 and a transmission filter (TX filter) 1311. The signal received by the antenna 1301 is transferred to the reception filter 1305 by the duplexer 1303, and the reception filter 1305. An output of the reception filter 1305 is amplified by a Low Noise Amplifier (LNA) 1307, filtered by a baseband filter 1309, and then input to a Digital Signaling Processor/Programmable Gate Array (DSP/PGA) 1317.

A reception DSP/PGA 1317 includes an Analog to Digital Converter (ADC) for converting the output of the baseband filter 1309 to a digital signal, and a buffer for storing the digital signal for a time period. A baseband processor 1321 reads the digital signal for the time period from the buffer within the reception DSP/PGA 1317, and performs a baseband processing including demodulation and decoding. The baseband processor 1321 can store data for re-reception and retransmission in a memory 1323.

The digital signal generated by the baseband processor 1321 is buffered by a transmission DSP/PGA 1319, converted to an analog signal at a designated timing, and then transmitted to a Power Amplifier (PA) 1313 through a baseband filter 1315. The power amplifier 1313 receives the output of the baseband filter 1315 to amplify the output according to a power control, and the transmission filter 1311 filters the signal amplified by the power amplifier 1313 according to a center frequency and a bandwidth of a designated frequency band, and transfers the filtered signal to the antenna 1301 through the duplexer 1303.

Although the structure including the duplexer 1303 is illustrated in FIG. 13, the duplexer 1303 may be omitted when transmission/reception timing of the control channel and transmission/reception timing of the data channel are separated to operate the UE in a half duplex mode. That is, since the half duplex is achieved regardless of whether the system supports FDD and TDD, the duplexer does not have to be used in the embodiment of FIG. 7. Accordingly, the embodiment of FIG. 7 has an effect of reducing the number of components of the UE and reducing manufacturing costs by limiting operations of the UE.

Since full-duplex is used in the embodiment of FIG. 8, the duplexer 1303 is required, but transmission/reception may be quickly performed by the UE, which reduces used power by 50% in comparison with the embodiment of FIG. 7.

The embodiment of FIG. 7 and the embodiment of FIG. 8 have the same advantages below, except for existence or nonexistence of the use of the duplexer 1303. That is, since the pass bandwidth of the reception filter 1305 and the transmission filter 1311 is narrow, the filters may be constructed with lower costs than that of a wideband UE. Since the DSP/PGA 1317 and 1319 for transmission of the uplink and the downlink use the Fast Fourier Transform (FFT) having a size of 128 in comparison with the legacy wideband UE using the FFT having a size of 2048, a cost reduction of twenty times or more may be obtained. The baseband processor 1321 may decrease a size of a temporary storage space for wideband reception to 10/1 or less of the size. A size of the memory 1323 for retransmission between the UE and the eNB may be decreased to minimally from 1/8 of the size maximally to 1/32 of the size. Due to the advantages, a product size of the narrow-band UE according to the embodiment of the present invention is decreased to 1/40 of the product size and power consumption is decreased to 1/4 of the power consumption.

Figure 14:
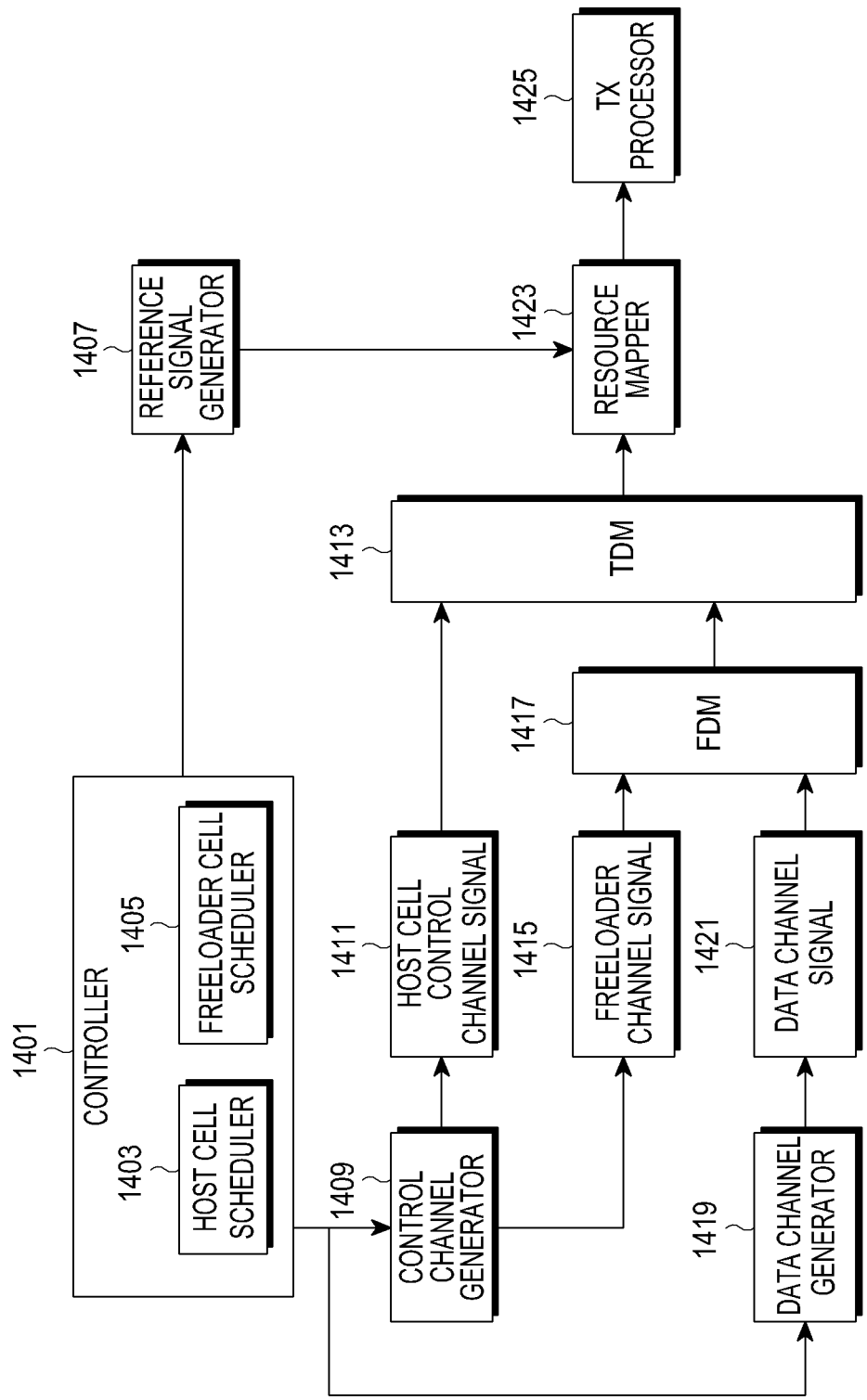
FIG. 14 illustrates a transmission structure of an eNB according to an embodiment of the present invention.

FIG. 14 illustrates a transmission configuration of the eNB according to an embodiment of the present invention.

Referring to FIG. 14, a controller 1401 has a host cell scheduler 1403 and a freeloader cell scheduler 1405, and controls overall operations of the remaining components. Particularly, each of the schedulers 1403 and 1405 controls control channel generation by a control channel generator 1409 for UEs controlled by the schedulers. The control channel generator 1409 generates a control channel 1411 including control information for the UE connected to the host cell and a control channel 1415 including control information for the UE connected to the freeloader cell according to a control of the controller 1401. Similarly, a data channel generator 1419 generates a data channel 1421 including data of the host cell and the freeloader cell according to the control of the controller 1401. Although not illustrated in FIG. 14, an output from a synchronization/broadcasting channel generator to generate a synchronization channel (PSS/SSS) and a broadcasting channel (PBCH) may be further input to a frequency multiplexer 1417 (FDM).

The frequency multiplexer 1417 maps and multiplexes the control channel 1415 and the data channel 1421 for the freeloader cell into a corresponding frequency band on the frequency domain by considering a size of the center frequency, a gap, and sizes and positions of guard bands according to the frame structure of FIG. 7 or 8. A time multiplexer 1413 (TDM) multiplexes the frequency-multiplexed signal output from the frequency multiplexer 1417 on the control channel 1411 of the host cell and the time domain.

A resource mapper 1423 maps the time-multiplexed signal output from the time multiplexer 1413 and a reference signal output from a reference signal generator 1407 into corresponding resource positions according to location information (pattern) of a reference signal. That is, the resource mapper 1423 allocates frequency resources of the host cell and the freeloader cells to respective users by considering the host cell, center frequencies of the freeloader cells, and guard bands. A transmission processor 1425 transmits the resource-allocated signal by the resource mapper 1423 through a transmission processing.

Figure 15:
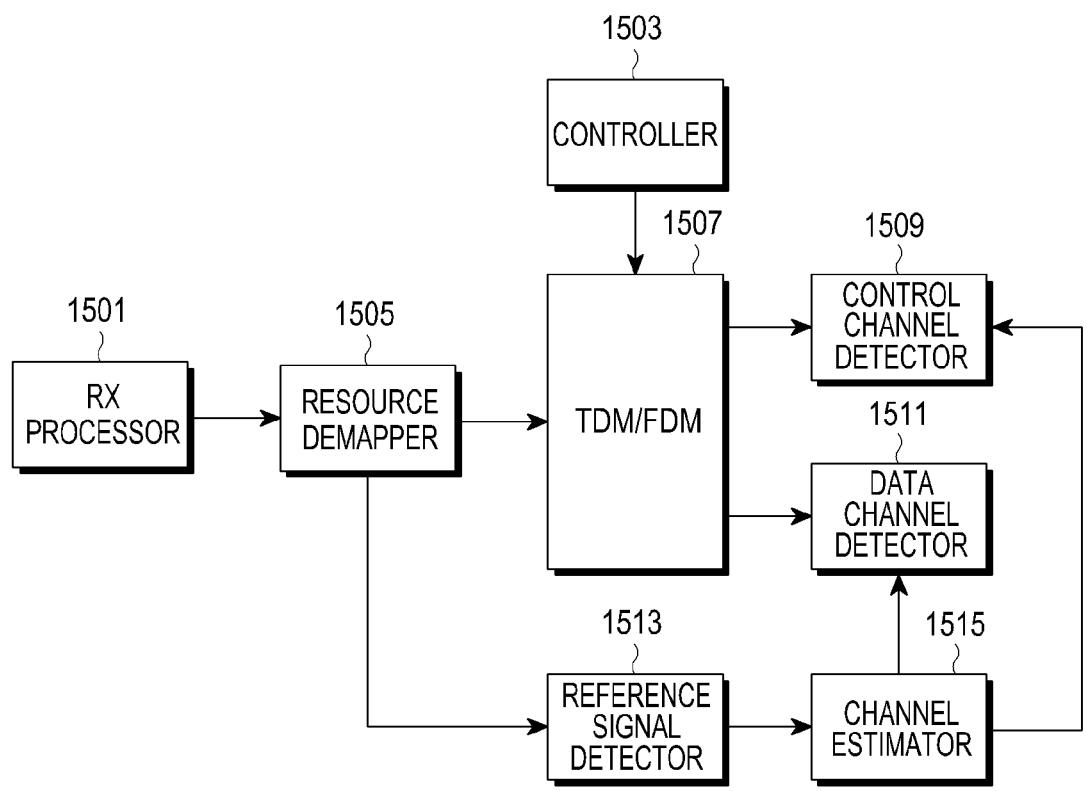
FIG. 15 illustrates a reception structure of a UE according to an embodiment of the present invention.

FIG. 15 illustrates a reception structure of the UE according to an embodiment of the present invention.

Referring to FIG. 15, signals received through a reception processor 1501 are distinguished by each resource domain through a resource demapper 1505 and then stored. A reference signal detector 1513 detects a reference signal from the received signal by considering positions of reference signals determined for respective bands of the host cell and freeloader cells, and a channel estimator 1515 performs channel estimation based on the detected reference signal to acquire channel information.

The acquired channel information is used for demodulation and decoding of each channel in a data channel detector 1511 and a control channel detector 1509. A time frequency demultiplexer 1507 demultiplexes the signal demapped by the resource demapper 1505 on the frequency and time domains. The control channel detector 1509 demodulates and decodes a control channel in a prearranged time/frequency position among the demultiplexed signal, and the data channel detector 1511 demodulates and decodes a data channel in a prearranged time/frequency position (that is, subframe/frequency band) among the demultiplexed signal based on control information decoded from the control channel. Although not illustrated, the time frequency demultiplexer 1507 receives signals of a synchronization channel (PSS/SSS) and a broadcasting channel (PBCH) in a prearranged time/frequency position (that is, subframe/frequency band), and can transmit the received signals to the controller 1503. The controller 1503 acquires eNB synchronization from the signals of the synchronization channel and the broadcasting channel, and acquires a Master Information Block (MIB).

While the present invention has been shown and described with reference to certain embodiments thereof, it will be understood by those skilled in the art that various changes in form and details may be made therein without departing from the spirit and scope of the present invention as defined by equivalents to the claims as well as the appended claims.

What is claimed is:

1. A method of operating multi-band and multi-cell, the method comprising:
    transmitting a synchronization channel and a broadcasting channel for narrow-band User Equipments (UEs) through a first band narrower than a system band, the first band being located in a center band of the system band;
    transmitting a control channel for scheduling a data channel for a first narrow-band UE, which is one of the narrow-band UEs, through a second band equal to or wider than the first band, the second band not overlapping the first band within the system band; and
    establishing Radio Resource Control (RRC) connection with the first narrow-band UE which is one of the narrow-band UEs through the first band, and transmitting information on the second band and location information of a subframe where the control channel is transmitted to the first narrow-band UE through the RRC connection,
    wherein the first band is equal to a band where the synchronization channel and the broadcasting channel of a host cell using an entire system band are transmitted.

2. The method of claim 1, wherein the control channel and the data channel are consecutively arranged on a time domain or have a subframe interval, and are transmitted in first and second subframes including a control channel region and a data channel region, respectively.

3. The method of claim 2, further comprising transmitting or receiving a response channel for the data channel after the subframe interval from the second subframe including the data channel region for the data channel.

4. The method of claim 1, wherein the second band is spaced from a center frequency of the system band by a gap, and has a bandwidth spaced from a boundary of the system band by a guard band.

5. The method of claim 1, wherein the second band includes a reference signal disposed in a same pattern or different patterns in a low frequency band and a high frequency band based on a center frequency of the system band.

6. The method of claim 1, further comprising transmitting, when downlink system information is updated, an update instruction signal for instructing to receive the updated system information in the first band through the second band by using high-layer signaling.

7. A method of performing communication with an enhanced Node B (eNB) operating multi-band and multi-cell, the method comprising:
    receiving a synchronization channel and a broadcasting channel for narrow-band User Equipments (UEs) through a first band narrower than a system band from an eNB, the first band being located in a center band of the system band;
    receiving a control channel for scheduling a data channel for a first narrow-band UE, which is one of the narrow-band UEs, through a second band equal to or wider than the first band from the eNB, the second band not overlapping the first band within the system band; and
    establishing Radio Resource Control (RRC) connection with the eNB through the first band, and receiving information on a bandwidth and a position of the second band and information on a position of a subframe where the control channel is transmitted, through the RRC connection,
    wherein the first band is equal to a band where the synchronization channel and the broadcasting channel of a host cell using all of an entire system band are transmitted.

8. The method of claim 7, wherein the control channel and the data channel are consecutively arranged on a time domain or have a subframe interval, and are transmitted in first and second subframes including a control channel region and a data channel region, respectively.

9. The method of claim 8, further comprising transmitting or receiving a response channel for the data channel after the subframe interval from the second subframe including the data channel region for the data channel.

10. The method of claim 7, wherein the second band is spaced from a center frequency of the system band by a gap, and has a bandwidth spaced from a boundary of the system band by a guard band.

11. The method of claim 7, wherein the second band includes a reference signal disposed in a same pattern or different patterns in a low frequency band and a high frequency band based on a center frequency of the system band.

12. The method of claim 7, further comprising, when downlink system information is updated, transmitting an update instruction signal for instructing to receive the updated system information in the first band through the second band by using high-layer signaling.

13. The method of claim 7, further comprising:
    receiving system information for the narrow-band UEs through the first band in a subframe after receiving the synchronization channel and the broadcasting channel; and
    transmitting capability information of the first narrow-band UE, an initial access signal, and an RRC connection request signal based on the system information.

14. An enhanced Node B (eNB) apparatus for operating multi-band and multi-cell, the eNB apparatus comprising:
    a first generator configured to generate a synchronization channel and a broadcasting channel for narrow-band User Equipments (UEs);
    a second generator configured to generate a control channel for scheduling a data channel for a first narrow-band UE, which is one of the narrow-band UEs;
    a frequency multiplexer configured to perform multiplexing by mapping the synchronization channel and the broadcasting channel into a first band narrower than a system band, the first band being located in a center band of the system band and mapping the control channel into a second band equal to or wider than the first band, the second band not overlapping the first band within the system band; and
    a controller configured to control operations of the first and second generators and the frequency multiplexer, to establish Radio Resource Control (RRC) connection with the first narrow-band UE which is one of the narrow-band UEs through the first band, and to transmit information on the second band and location information of a subframe where the control channel is transmitted to the first narrow-band UE through the RRC connection, wherein the first band is equal to a band where the synchronization channel and the broadcasting channel of a host cell using all of an entire system band are transmitted.

15. The eNB apparatus of claim 14, wherein the control channel and the data channel are consecutively arranged on a time domain or have a subframe interval, and are transmitted in first and second subframes including a control channel region and a data channel region, respectively.

16. The eNB apparatus of claim 15, wherein the controller transmits or receives a response channel for the data channel after the subframe interval from the second subframe including the data channel region for the data channel.

17. The eNB apparatus of claim 14, wherein the second band is spaced from a center frequency of the system band by a gap, and has a bandwidth spaced from a boundary of the system band by a guard band.

18. The eNB apparatus of claim 14, wherein the second band includes a reference signal disposed in a same pattern or different patterns in a low frequency band and a high frequency band based on a center frequency of the system band.

19. The eNB apparatus of claim 14, wherein when downlink system information is updated, the controller transmits an update instruction signal for instructing to receive the updated system information in the first band through the second band by using a high-layer signaling.

20. A User Equipment (UE) apparatus for performing communication with an enhanced Node B (eNB) operating multi-band and multi-cell, the UE apparatus comprising:
 a controller configured to detect a synchronization channel and a broadcasting channel for narrow-band UEs through a first band narrower than a system band from the eNB, the first band being located in a center band of the system band; and
 a control channel detector configured to detect a control channel for scheduling a data channel for a first narrow-band UE, which is one of the narrow-band UEs, through a second band equal to or wider than the first band from the eNB, the second band not overlapping the first band within the system band, wherein the first band is equal to a band where the synchronization channel and the broadcasting channel of a host cell using all of an entire system band are transmitted, the controller is configured to establish Radio Resource Control (RRC) connection with the eNB through the first band, and to receive information on a bandwidth and a position of the second band and information on a position of a subframe where the control channel is transmitted, through the RRC connection.

21. The UE apparatus of claim 20, wherein the control channel and the data channel are consecutively arranged on a time domain or have a subframe interval, and are transmitted in first and second subframes including a control channel region and a data channel region, respectively.

22. The UE apparatus of claim 21, wherein the controller transmits or receives a response channel for the data channel after the subframe interval from the second subframe including the data channel region for the data channel.

23. The UE apparatus of claim 20, wherein the second band is spaced from a center frequency of the system band by a gap, and has a bandwidth spaced from a boundary of the system band by a guard band.

24. The UE apparatus of claim 20, wherein the second band includes a reference signal disposed in a same pattern or different patterns in a low frequency band and a high frequency band based on a center frequency of the system band.

25. The UE apparatus of claim 20, wherein when downlink system information is updated, the controller transmits an update instruction signal for instructing to receive the updated system information in the first band through the second band by using a high-layer signaling.

26. The UE apparatus of claim 20, wherein the controller receives system information for the narrow-band UEs through the first band in a subframe after receiving the synchronization channel and the broadcasting channel, and transmits capability information of the first narrow-band UE, an initial access signal, and an RRC connection request signal based on the system information.

\* \* \* \* \*